United States Patent [19]
Gorshe

[11] Patent Number: 5,195,110
[45] Date of Patent: Mar. 16, 1993

[54] CLOCK RECOVERY AND DECODER CIRCUIT FOR A CMI-ENCODED SIGNAL

[75] Inventor: Steven S. Gorshe, Beaverton, Oreg.

[73] Assignee: NEC America, Inc., Melville, N.Y.

[21] Appl. No.: 678,400

[22] Filed: Apr. 1, 1991

[51] Int. Cl.[5] .............................................. H04L 7/02
[52] U.S. Cl. ...................................... 375/110; 375/95
[58] Field of Search ........................ 375/23, 55, 87, 95, 375/110; 360/40; 341/71

[56] References Cited

U.S. PATENT DOCUMENTS

| | | | |
|---|---|---|---|
| 3,593,160 | 7/1971 | Moore | 375/111 |
| 4,242,755 | 12/1980 | Giauzan | 375/87 |
| 4,317,211 | 2/1982 | Quesnell, Jr. | 375/87 |
| 4,562,422 | 12/1985 | Pospischil | 360/44 |
| 4,651,328 | 3/1987 | den Hollander et al. | 375/25 |
| 4,740,998 | 4/1988 | House | 375/110 |
| 4,761,635 | 2/1988 | Arnaune et al. | 341/73 |
| 4,787,097 | 11/1988 | Rizzo | 375/95 |
| 4,808,970 | 2/1989 | Arnaune | 375/120 |
| 4,823,363 | 4/1989 | Yoshida | 375/120 |
| 4,837,782 | 6/1989 | Sasaki | 375/49 |
| 4,873,524 | 10/1989 | Akkermans | 360/44 |
| 5,038,351 | 8/1991 | Sakai et al. | 375/110 |

Primary Examiner—Curtis Kuntz
Assistant Examiner—Vijay Shankar
Attorney, Agent, or Firm—Sughrue, Mion, Zinn, Macpeak & Seas

[57] ABSTRACT

A method and digital circuit for decoding and recovering a data clock from an incoming stream of Coded Marked Inversion (CMI) encoded data. The CMI encoded data is applied to a shift register where the data is sampled at a rate greater than the incoming transfer rate thus providing multiple samples per data period. The multiple samples having a high logical value occuring during the first half of a data period are counted and a represented value is outputted. The multiple samples having a high logical value occurring during the second half of the data period are also counted and a second represented value is outputted. The two represented values are compared and a single CMI-decoded data bit is determined. The multiple samples are also compared to detect a high-to-low transition which, according to the CMI format, constitutes a data boundary. First and second free-running counters are provided, whose most significant output bits provide an initial clock signal and a recovered data clock, respectively. Upon each boundary detection occurring within a predetermined region, the first free-running counter is reset to an initial count and thereby resynchronized with the incoming stream of data. The initial and terminal counts of the second counter are adjusted by a phase controller to keep the recovered data clock phase-locked to the initial clock signal.

25 Claims, 11 Drawing Sheets

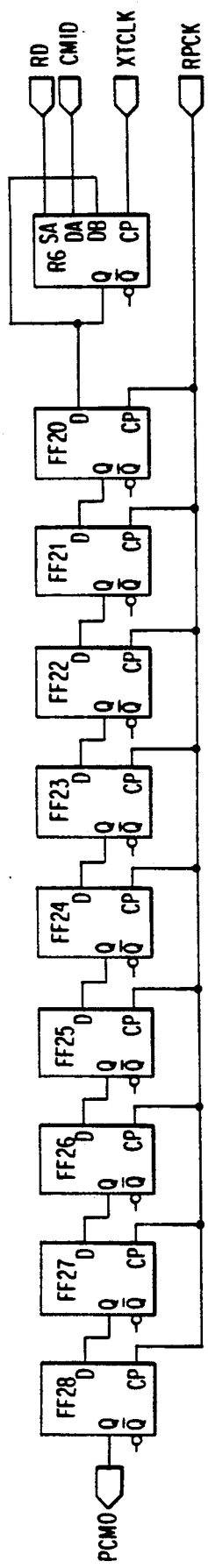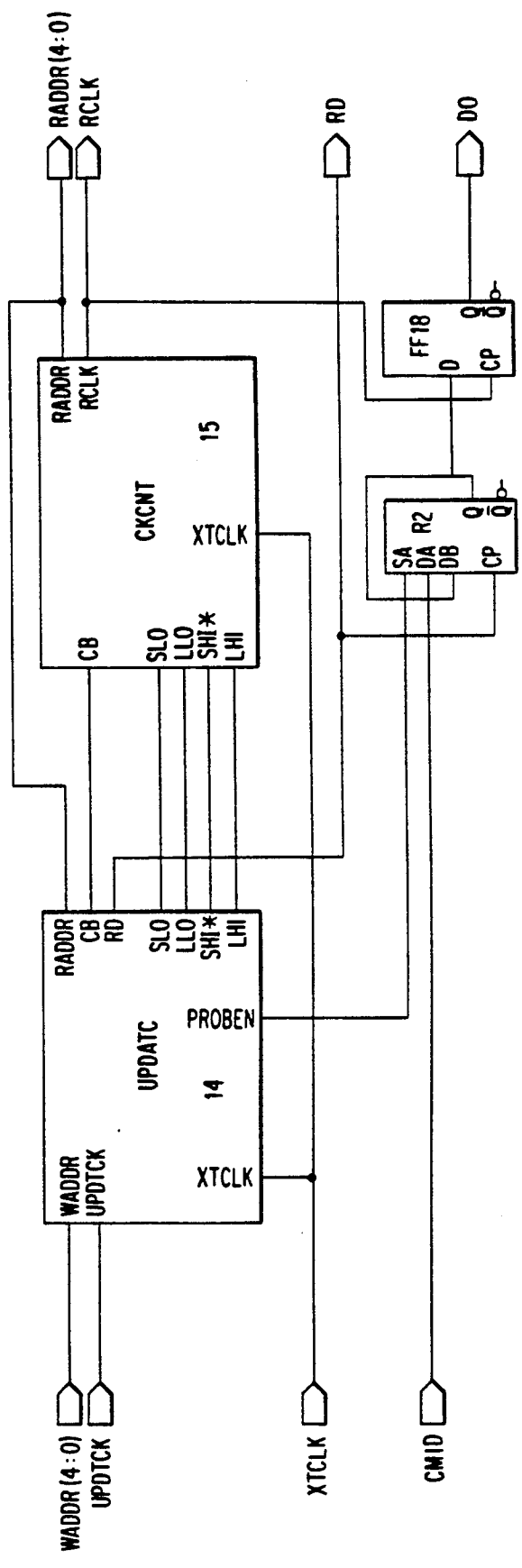
FIG. 9
FIG. 10

CLOCK RECOVERY AND DECODER CIRCUIT FOR A CMI-ENCODED SIGNAL

BACKGROUND OF THE INVENTION

The present invention relates, in general, to a circuit for receiving data and, in particular, to a method and digital circuit for decoding and recovering a clock signal from an incoming stream of Coded Marked Inversion (CMI) encoded data.

In applications relating to the transmission of digital data, for example, across an optical fiber link, the format of the transmitted optical signal is always of concern. This is an important consideration because the decision circuitry in the receiver must be able to extract precise timing information from the incoming optical signal. Three main purposes of the timing information are to allow the signal to be sampled by the receiver at the time the signal-to-noise ratio is a maximum, to maintain the proper pulse spacing, and to indicate the start and end of each timing interval. In addition, since errors resulting from noise and distortion can occur in the signal detection process, it may be desirable for the optical signal to have an inherent error-detecting capability. These features can be incorporated into the data stream by encoding the signal according to, for example, the CMI format which is a well-known technique.

The CMI format is a two-level line code in which each bit of the digital data is converted into a pair of data bits. An example of a stream of digital data being converted from the Non-Return-to-Zero (NRZ) format to the CMI format is shown in FIG. 1. Specifically, a data bit of "0" is converted into a pair of data bits "0,1", and a data bit of "1" is converted alternately into a pair of data bits "0,0" and "1,1". The pair of data bits "1,0" is, by definition, an illegal combination. The converted pair of data bits, i.e., "0,1", "0,0", or "1,1", is transmitted within the same time frame (period P) in which the digital data is applied to the encoding unit.

Receivers which decode and/or extract a timing signal from an incoming stream of CMI encoded data are known. For example, U.S. Pat. No. 4,808,970 to Arnaune shows a device for decoding CMI encoded data. Arnaune discloses a circuit having a transition detector circuit, a clock recovery circuit and a decoding circuit. The transition detector detects a negative transition (i.e., from a "1" to a "0") in a coded succession of CMI encoded data. Upon each detected transition, the clock recovery circuit causes a controllable oscillator to be resynchronized. That is, the clock recovery circuit is designed so as to form a loop for controlling the time shift between each detected transition and the following rising edge of the oscillator's output. The oscillator's output is then applied to the decoder circuit for synchronizing the decoder circuit to detect transitions in the received data signal.

The clock recovery circuit disclosed in Arnaune, however, presents several disadvantages. First, the circuit is not completely synchronous, and the combination of synchronous and asynchronous circuits introduces many difficulties in implementing the circuits. Second, Arnaune's clock recovery circuit includes a controllable oscillator and analog components requiring very precise tolerances and which, therefore, are generally more expensive than corresponding elements in completely synchronous circuits.

The device of Arnaune is further disadvantageous in that there are no means of minimizing the effects of noise or jitter.

U.S. Pat. No. 4,740,998 to House relates to a circuit and method for recovery of a data clock. In particular, House discloses a source clock signal, a means for detecting state transitions in an incoming data stream (in the Non-Return-to-Zero Inverted (NRZI) form), and a counter for generating a recovered data clock. Upon the detection of any transition in the data stream, the counter is reset. A major disadvantage of this circuit, similar to the Arnaune circuit, is that no provisions are made for reducing the effects of noise or attenuating jitter. Thus, noise in the incoming data signal, for example, can easily cause either circuit to falsely detect a transition.

SUMMARY OF THE INVENTION

It is therefore an object of the present invention to provide a digital circuit and method for decoding and recovering a data clock from an incoming stream of digital data encoded in the CMI format which is free of the above-mentioned problems.

The above and other objects of the invention are accomplished by a completely digital electrical circuit for decoding and recovering a clock signal from an incoming stream of CMI encoded data. A circuit for implementing the invention includes a circuit for supplying a source clock signal, a circuit for sampling the incoming signal, a circuit for detecting boundaries, a circuit for decoding the incoming signal, a circuit for extracting a timing signal from the incoming signal and generating an initial clock signal, a circuit for producing a de-jittered data clock phase-locked to the initial clock signal, a circuit for controlling and adjusting the phase of the data clock relative to the initial clock signal, and a circuit for storing and outputting the decoded data.

The present invention also relates to a method for recovering a clock from an incoming stream of CMI encoded data, which includes the steps of: producing an initial recovered clock signal by incrementing a first counter at a predetermined rate (N), counting from an initial count to a terminal count, the initial recovered clock signal being an output of the first counter; producing a recovered data clock signal phase-locked to the initial recovered clock signal by incrementing a second counter at a predetermined rate (N); counting from a second initial count to a second terminal count, the recovered data clock being an output of the second counter; taking multiple samples of the stream of CMI encoded data at the predetermined rate (N); detecting at least every third boundary between the CMI encoded data by comparing multiple samples of the stream of CMI encoded data and detecting a predetermined pattern; resetting the first counter to the initial count upon detection of the predetermined pattern occurring outside of a guardband range; determining a phase shift between the output of the first counter and the output of the second counter; and adjusting the second initial count or the second terminal count to phase-lock the second counter with the first counter.

The present invention also relates to a method for decoding an incoming stream of CMI encoded data, which includes the steps of: taking multiple samples of a stream of binary bits representing the CMI encoded data at second predetermined rate; incrementing a first counter for each sample having a high logical value during a first half of the period P, and outputting a first signal if the first counter reaches a predetermined number; incrementing a second counter for each sample having a high logical value during a second half of the period P, and outputting a second signal if the second counter reaches the predetermined number; and comparing the first and second signals, and outputting a signal representing a CMI decoded data bit as a result of the comparison.

An advantage and feature of the present invention is that it can be constructed with standard digital components.

A further advantage of the present invention is that the effects of noise are reduced, and therefore the clock recovery will not be adversely affected by random noise, and the expected jitter on the incoming signal can still be tracked (per CCITT G.823 and 0.171 jitter templates).

A further advantage of the present invention is that a method and circuit arrangement is provided for reducing the effects of noise and therefore increasing the accuracy of the CMI decoder circuit.

Other features and advantages of the invention will be apparent from the following description of the preferred embodiments, and from the claims.

BRIEF DESCRIPTION OF THE DRAWINGS

FIG. 9 shows a more detailed diagram of the SHIFT9 block shown in FIG. 2.

FIG. 10 shows a more detailed diagram of the CLKREC block shown in FIG. 2.

DESCRIPTION OF THE PREFERRED EMBODIMENTS

Referring to the accompanying drawings, preferred embodiments of the present invention will be described in detail.

Figure 1:
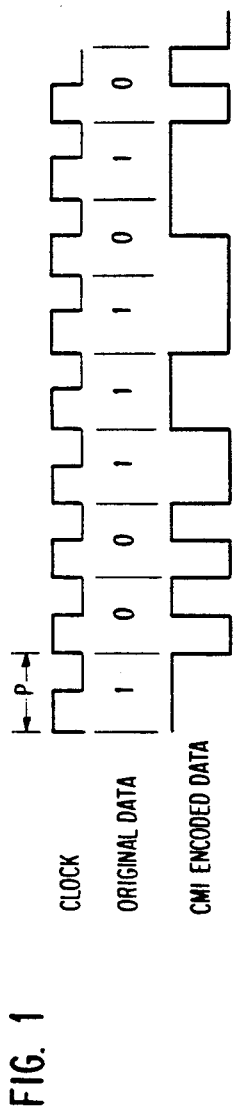
FIG. 1 shows a timing diagram representing NRZ data being encoded according to the CMI format.
Figure 2:
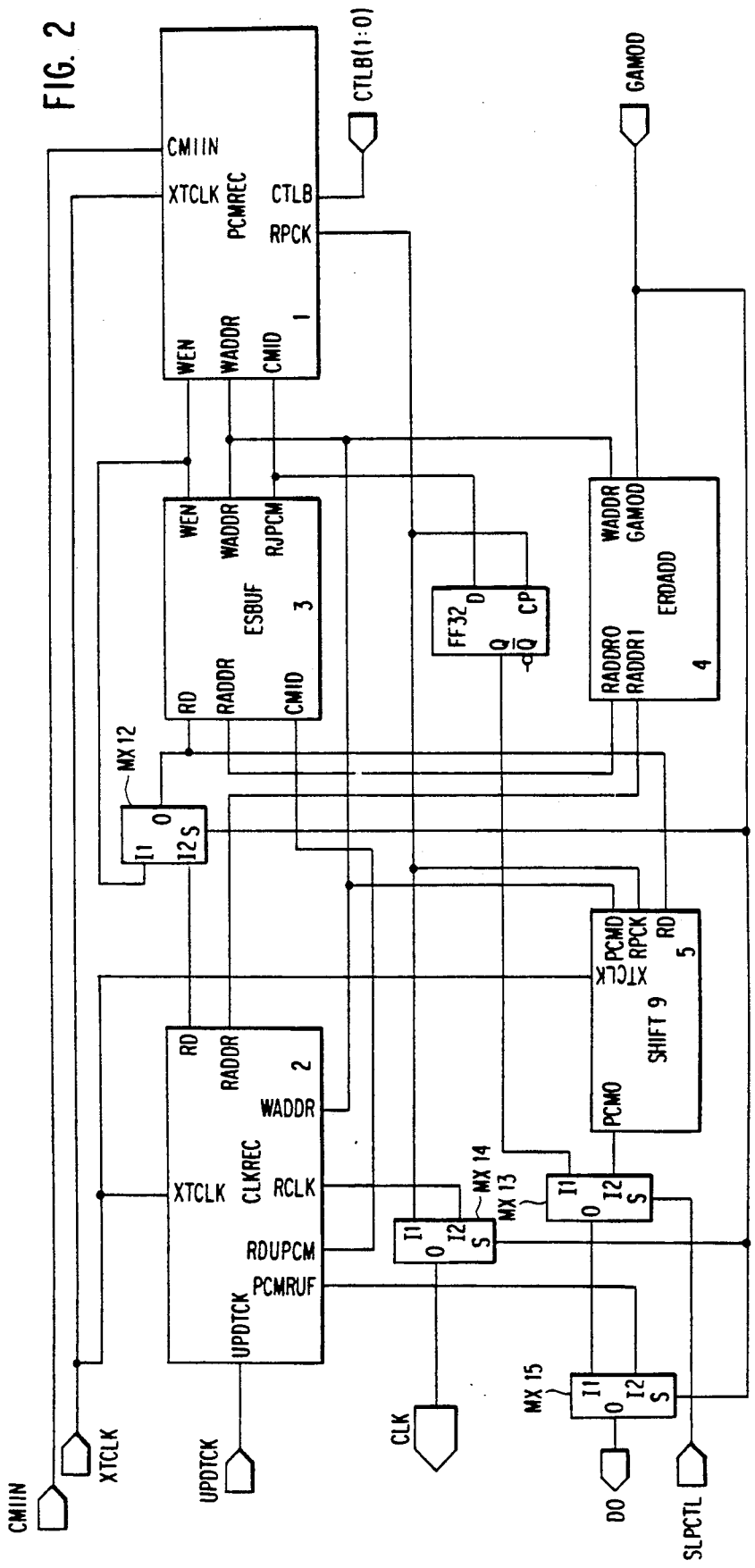
FIG. 2 shows a block diagram of one embodiment of a CMI decoder and clock recovery circuit of the invention.

Referring to FIG. 2, there is shown a block diagram of a digital decoder and clock recovery circuit constructed in accordance with the teachings of the invention. The primary functions of the circuit are decoding and recovering a data clock from an incoming stream of binary data which represents data that has been CMI encoded in accordance with the CMI format.

The digital decoder and clock recovery circuit is composed of five main blocks, PCMREC 1, ESBUF 2, CLKREC 3, ERDADD 4, and SHIFT9 5. A general overview of the functions of these blocks will be given, followed by a detailed description of each block.

The PCMREC block 1 decodes the incoming stream of data CMIIN and outputs CMI decoded data CMID (i.e., data in the NRZ format). The PCMREC block 1 also extracts a timing signal from the incoming stream of data CMIIN and generates an initial data clock RPCK. Finally, the PCMREC block 1 generates write control signals, namely, a five-bit address WADDR and a write enable signal WEN, for controlling write operations to the ESBUF block 3. The CLKREC block 2 produces a data clock RCLK, which is frequency locked or phase-locked to the initial data clock RPCK extracted and generated by the PCMREC block 1, with a limited amount of jitter. In other words, the data clock RCLK is a de-jittered version of the recovered initial data clock RPCK.

The CLKREC block 2, in synchronism with the data clock RCLK, holds and samples the data CMID read from ESBUF 3. The CLKREC block 2 also generates read control signals for controlling read operations to the ESBUF block 3. The ESBUF block 3 contains a 32 bit memory having a one bit word width, with the capability of performing fully independent read and write operations. A control signal GAMOD selects one of two modes of operation in which the ESBUF block 3 can operate. In the first mode, the ESBUF block 3 acts as a 32-bit elastic store buffer for the CMI decoded data CMID. That is, data is randomly read and written to a location designated by either the read or write addresses RADDR(4:0) or WADDR(4:0), respectively. In the second mode, the ESBUF block 3 acts as a 31-bit serial shift register, thus causing a delay of 31 clock periods. Based on the mode designated by the control signal GAMOD, the ERDADD block 4 selects the source of the read address for performing read operations to the ESBUF block 3, and a multiplexer MX12 selects the source of the read enable signal. More specifically, when the ESBUF block 3 is arranged as a 32-bit elastic store buffer, the ERRADD block 4 sets the read address RADDRO(4:0) to the read address RADDR(4:0) generated by the CLKREC block 2. The read enable signal is set to the read enable signal generated by the CLKREC block 2. On the other hand, when the ESBUF block 3 is arranged as a 31-bit serial shift register, the read address RADDRO(4:0) is set to the write address WADDR(4:0) generated by the PCMREC block 1, plus one. The read enable signal is set to the write enable signal generated by the PCMREC block 1. Therefore, in the latter mode of operation, the read address will always lead the write address by one. The SHIFT9 block 5 includes a nine-bit serial shift register for providing additional delay to the data. When the ESBUF block 3 is arranged as a 31-bit serial shift register, the SHIFT9 block 5 is utilized and, therefore, a total of 40 clock periods of delay are induced.

A D-type flip-flop FF32 and multiplexers MX12-MX15, the remaining components shown in FIG. 2, are provided to configure the decoder and clock recovery circuit for different applications. In a typical application, the signal GAMOD selects a first input of a multiplexer MX14 to select the data clock RCLK outputted from the CLKREC block 2 and a first input of the multiplexer MX15 to select the decoded data PCMRUF from the CLKREC block 2. However, in other applications where jitter attenuation is not necessary, the signal GAMOD selects a second input of the multiplexers MX14 and MX15, thus selecting the initial clock signal RPCK outputted from the PCMREC block 1 and the decoded data outputted from a multiplexer MX13. The output of the multiplexer MX13, which depends on a control signal SLPCTL, represents either the decoded data CMID outputted from the SHIFT9 block or the non-inverting output of the flip-flop FF32. The difference between the data at the inputs of the multiplexer MX13 is whether a 40-clock-period delay has been induced or not, which is dependent upon the status of the control signal SLPCTL.

Figure 3:
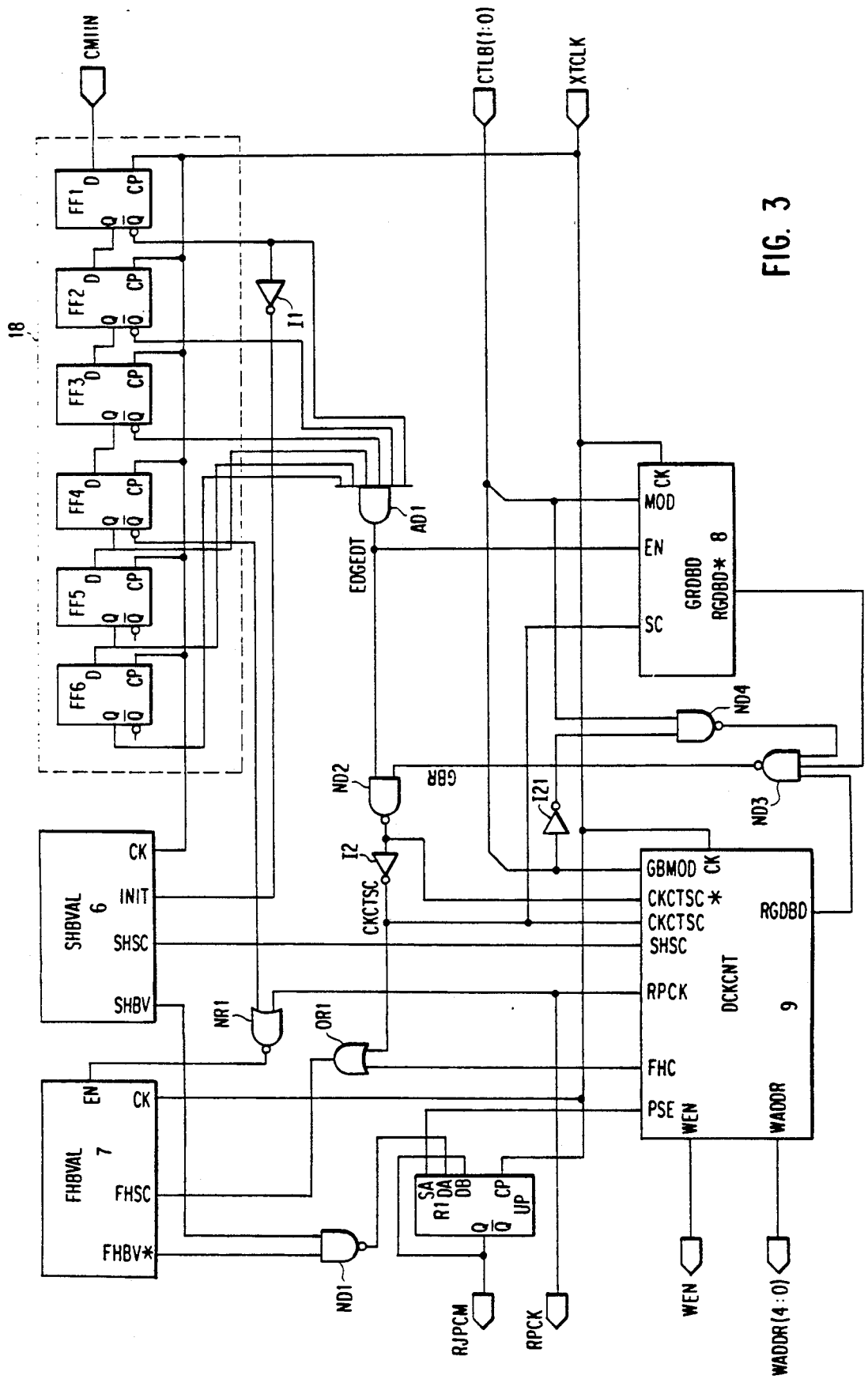
FIG. 3 shows a more detailed diagram of the PCMREC block shown in FIG. 2.

Referring now to FIG. 3, there is shown the PCMREC block 1 in more detail. A series of D-type flip-flops FF1–FF6 are arranged such that a non-inverting output of the first flip-flop FF1 is coupled to a D input of the second flip-flop FF2; a non-inverting output of the second flop-flop FF2 is coupled to a D input of the third flip-flop FF3; and so on, thereby forming a six-bit serial shift register 18. A 24.576 MHz sampling clock XTCLK, whose frequency is twelve times the transfer rate of the incoming data CMIIN, is provided to clock inputs CP of the flip-flops FF1–FF6, causing synchronous operation of the serial shift register. An inverting output of the flip-flop FFI is input to a SHBVAL block 6 via an inverter gate I1. An inverting output of the flip-flop FF4 is input to a first input of a NOR gate NRI along with the clock signal RPCK which is connected to a second input of the same gate providing an enable to a FHBVAL block 7. To detect a high-to-low transition (i.e., a data boundary), the inverting outputs of the first three flip-flops FF1–FF3 are connected to three inputs of a six-input AND gate A1, and the non-inverting outputs of the second three flip-flops FF4–FF6 are connected to the remaining three inputs of the six-input AND gate A1. Therefore, an output EDGEDT of AND gate A1 occurs only when three samples having a low logical value follow three samples having a high logical value. The output EDGEDT is coupled to a GRDBD block 8 and a first input of a NAND gate ND2. An output GBR of the GRDBD block 8 is connected to a second input of the NAND gate ND2 via a three-input NAND gate ND3. An output CKCTSC* (wherein * as used herein denotes an active low signal) of the NAND gate ND2, which represents the occurrence of an edge detection (or data boundary) outside of a guardband region, is inverted by an inverter gate I2 to generate its inverted counterpart signal CKCTSC. The signal CKCTSC* is also coupled to a DCKCNT block 9 wherein a second half synchronous clear signal SHSC is generated. The signal CKCTSC along with a synchronous clear signal FHC are respectively coupled to first and second inputs of an OR gate ORI for generating a first half synchronous clear signal FHSC. In addition, the signal CKCTSC is coupled to the DCKCNT block 9 and the GRDBD block 8, also for causing a synchronous clear.

The DCKCNT block 9 receives, in addition to the above-mentioned signals, control signals CTLB(1:0) and the sampling clock XTCLK. A signal RGDBD, which is generated by the DCKCNT block 9 and is connected to a first input of the three-input NAND gate ND3, represents, when in its active state, that the output of a counter circuit 10 is within the guardband region. The DCKCNT block 9 also generates the write enable signal WEN, five-bit write address WADDR, two synchronous clear signals FHC and SHSC to respectively clear the first and second half period P bit evaluator circuits FHBVAL block 7 and SHBVAL block 6, and an enable signal PSE to enable a register R1.

The GRDBD block 8 receives, in addition to the above-mentioned signals, the control signals CTLB(1:0) and the sampling clock XTCLK. The GRDBD block 8 generates a signal RGDBD*, connected to a second input of a three input NAND gate ND3, which represents the occurrence of a predetermined number of consecutive guardband violations. The third input of the NAND gate ND3 is connected to an output of a NAND gate ND4. The first and second inputs of the NAND gate ND4 are respectively connected to the control bit CTLB(0) and inverted control bit CTLB(1), which is by the inventer I21.

The FHBVAL block 7 receives, in addition to the above-mentioned signals, the sampling clock XTCLK, the synchronous clear signal FHSC, and an enable signal EN. The enable signal EN is an output of the NOR gate NR1 and enables the FHBVAL block 7. The signal FHSC is the output of the OR gate ORI which represents either the detection of a data boundary or the counter 10 rolling over. The FHBVAL block 7 outputs a signal FHBV* which represents whether the logical signal of the first half period P was a logic high or low. The SHBVAL block 6 receives, in addition to the above-mentioned signals, the sampling clock XTCLK and the synchronous clear signal SHSC. The SHBVAL block 6 outputs a signal SHBV which represents whether the logical signal of the second half period P was a logic high or low. The outputs FHBV* and SHBV are connected to first and second inputs, respectively, of a NAND gate ND1. The output of the NAND gate ND1 is connected to a select input SA of the register R1, which outputs the CMI decoded data bit CMID in synchronism with the sampling clock XTCLK when the signal PSE is present.

Figure 4:
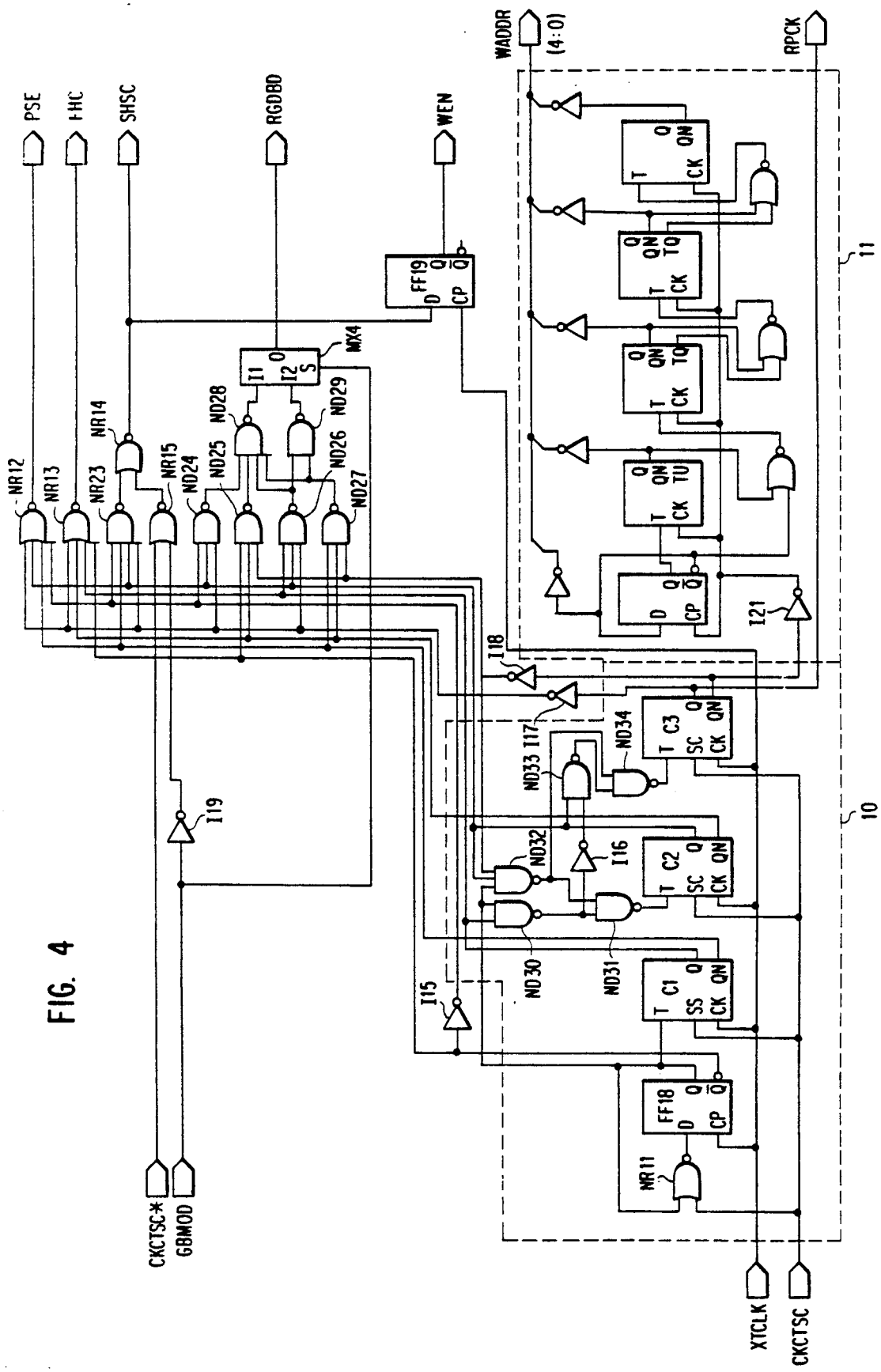
FIG. 4 shows a more detailed diagram of the DCKCNT block shown in FIG. 3.

Referring now to FIG. 4, the DCKCNT block 9 is shown in more detail. A divide-by-12 counter 10, which generates the initial clock signal RPCK, is designed to continuously count from an initial count of two to a terminal count of thirteen (i.e., 2, 3, 4, . . . 11, 12, 13, 2, 3 . . .). The sampling clock XTCLK is coupled to clock inputs CP of the counter 10, thus causing the counter to count twelve states in one data period P. The signal CKCTSC along with a non-inverting output of a flip-flop FF18 is coupled to an input of a NOR gate NR11 whose output is coupled to a D input of the same flip-flop FF18. The non-inverting output of the flip-flop FF18 is also coupled to a T input of a first circuit C1. An input T of a second circuit C2 is connected to an output of a NAND gate ND31, whose inputs are coupled to outputs of two other NAND gates ND30 and ND32. First and second inputs of the NAND gate ND30 are respectively connected to the non-inverting outputs of the flip-flop FF18 and circuit C1. The three inputs of the NAND gate ND32 are connected to the non-inverting outputs of the flip-flop FF18 and circuit C2, and to the output of an inverter I18 whose input is connected to an inverting output of a circuit C3. An input T of the third circuit C3 is connected to an output of a NAND gate ND34 whose first and second inputs are respectively coupled to outputs of the NAND gates ND33 are connected to a non-inverting output of the circuit C2 and an output of an inverter I16, whose input is also connected to the output of the NAND gate ND30. The non-inverting output of the circuit C3, which is the most significant bit (MSB) of the counter 10, represents the initial recovered data clock RPCK. Because the initial count and terminal count were respectively selected as two and 13, the initial recovered data clock RPCK will maintain on average a 50 percent duty cycle. That is, the MSB of the counter 10 will be high for six sampling clock XTCLK periods and low for six sampling clock XTCLK periods. The inverting output of the circuit C3 is inverted by an inverter I21 and used as a clock input CP for a typical five-bit binary counter 11 whose output constitutes the five-bit write address WADDR(4:0).

The logic for generating the control signals PSE, FHC, SHSC, RGDBD, and WEN are variously interconnected to the outputs of the counter 10, causing each of the signals to be asserted on different counter 10 output states. The signal PSE, which is asserted on the tenth state, is coupled to an output of a NOR gate NR12, whose four inputs are connected to outputs of inverters I15 and I17, the non-inverting output of the circuit C2, and the inverting output of the circuit C1. The signal FHC, which is asserted on the thirteenth state, is coupled to an output of a NOR gate NR13 whose four inputs are coupled to the inverter I17, the inverting outputs of the flip-flop FF18 and circuit C2, and the non-inverting output of the inventing output circuit C1. The signal SHSC, which is asserted on the fifth state, is connected to a NOR gate NR14 whose first and second inputs are respectively connected to outputs of a NAND gate ND23 and NOR gate NR15. Inputs of the NAND gate ND23 are connected to outputs of inverters I15 and I17, the inverting output of the circuit C1, and the non-inverting output of the circuit C2. Inputs of the NOR gate NR14 are connected to the signal CKCTSC* and GBMOD via an inverter I19. The signal SHSC is also coupled to a D input of a flip-flop FF19 which registers and outputs the write enable signal WEN in the sixth state in synchronism with the sampling clock XTCLK.

The signal RGDBD is asserted when the counter 10 is in one of two predetermined ranges, i.e., five to ten, or six to nine. The predetermined range selected is dependent on the state of the mode signal GBMOD which selects one of two inputs of the 2-to-1 multiplexer MX4. The first input of the multiplexer MX4 is coupled to an output of a NAND gate ND28 and the second input is coupled to an output of a NAND gate ND29. Four inputs of the NAND gate ND28 are respectively connected to four outputs of the NAND gates ND24–ND27. Inputs of the NAND gate ND29 are respectively connected to the outputs of the NAND gates ND26 and ND27. Inputs of the NAND gate ND24 are connected to outputs of the inverters I15 and I17, and the non-inverting output of the circuit C2. Inputs of the NAND gate ND25 are connected to the inverting outputs of the flip-flop FF18 and circuit C2, and the output of the inverter I18. Inputs of the NAND gate ND26 are connected to the non-inverting outputs of circuits C1 and C2, and the output of the inverter I17. The inputs of the NAND gate ND27 are connected to the inverting outputs of circuits C1 and C2, and the output of the inverter I18.

Figure 5:
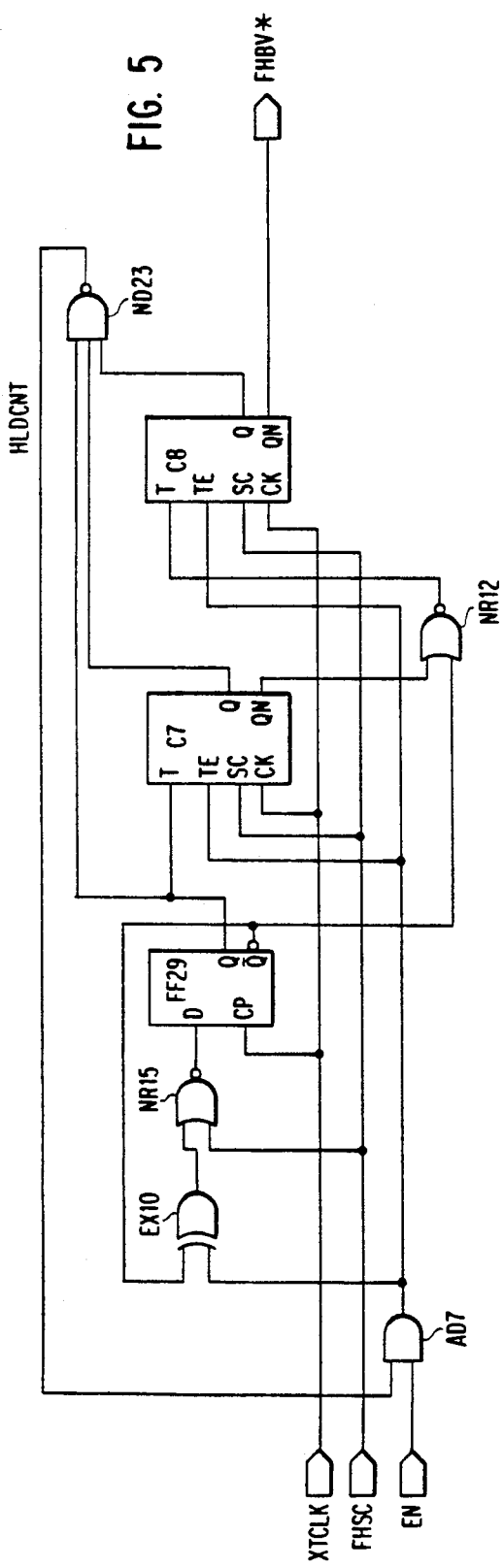
FIG. 5 shows a more detailed diagram of the FHBVAL block shown in FIG. 3.

In FIG. 5, there is shown a circuit diagram of the FHBVAL block 7 forming a three-bit synchronous counter for counting the logical high values of the sampled data. In detail, the sampling clock XTCLK is connected to clock inputs CP of a flip-flop FF29 and to circuits C7 and C8. The first half synchronous clear signal FHSC is coupled to an input of a NOR gate NR15 and synchronous clear SC inputs of circuits C7 and C8. The enable signal EN and control signal HLDCNT are respectively connected to first and second inputs of an AND gate AD7. An output of the AND gate AD7 is coupled to an input of an exclusive-OR gate EX10 and count enable inputs TE of the circuits C7 and C8. The other input of the exclusive-OR gate EX10 is connected to the inverting output of the flip-flop FF29. An output of the exclusive-OR gate EX10 is connected to a second input of the NOR gate NR15. An output of the NOR gate NR15 is connected to a D input of the flip-flop FF29. A non-inverting output of the flip-flop FF29 is coupled at the next stage of the counter to an input T of the circuit C7, and also to a first input of a three-input NAND gate ND23. An input T of the circuit C8 is connected to a NOR gate NR12 whose first and second inputs are respectively connected to the inverting outputs of the flip-flop FF29 and circuit C7. The non-inverting outputs of the circuits C7 and C8 are respectively connected to the remaining second and third inputs of the NAND gate ND23. An inverting output FHBV* of the circuit C8 represents the logical value of the sampled data for the first half period P.

Figure 6:
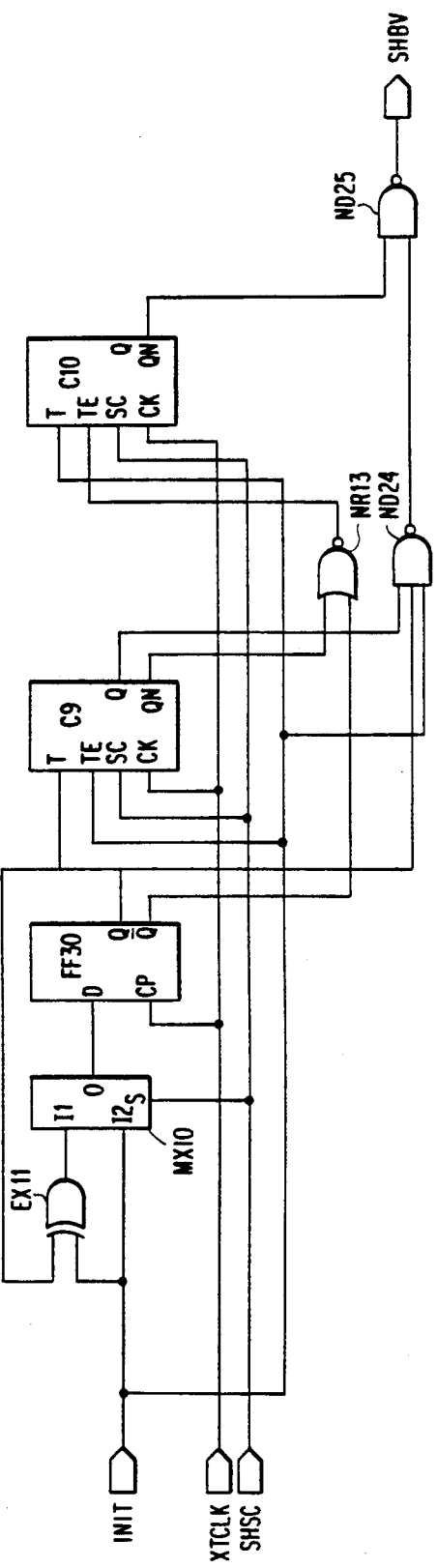
FIG. 6 shows a more detailed diagram of the SHBVAL block shown in FIG. 3.

The SHBVAL block 6 circuit is shown in FIG. 6. The sampling clock XTCLK is provided to clock inputs CP of a flip-flop FF30, and circuits C9 and C10, which form a three-bit counter. The second half synchronous clear signal SHSC, which is coupled to an input select line IS of a multiplexer MX10, and synchronous clear SC inputs of the circuits C9 and C10, cause the counters to initialize to a binary count of one or zero, depending on whether the signal INIT has a logical value of one or zero. A D input of the flip-flop FF30 is coupled to an output of the multiplexer MX10. The multiplexer MX10 selects one of its two inputs, where the first input is connected to an output of an exclusive-OR gate EX11 and the second input is connected to the data enable signal INIT. First and second inputs of the exclusive-OR gate EX11 are respectively connected to the non-inverting output of the flip-flop FF30 and the data enable INIT signal. The data enable signal INIT is also coupled to a first input of a three-input NAND gate ND24, and count enable inputs TE of the circuits C9 and C10. An input T of the circuit C9 is coupled to the non-inverting output of the flip-flop FF30. An input T of circuit C10 is coupled to an output of a NOR gate NR13 whose first and second inputs are respectively coupled to inverting outputs of the flip-flop FF30 and circuit C9. An output of a NAND gate ND25 represents the output SHBV of the SHBV block 6, and is asserted when the count is greater than four or equal to three with the signal INIT being asserted. First and second inputs of the NAND gate ND25 are connected to an inverting output of the circuit C10 and an output of the NAND gate ND24. The second and third inputs of the NAND gate ND24 are connected to non-inverting outputs of flip-flop FF30 and circuit C9, respectively.

Figure 7:
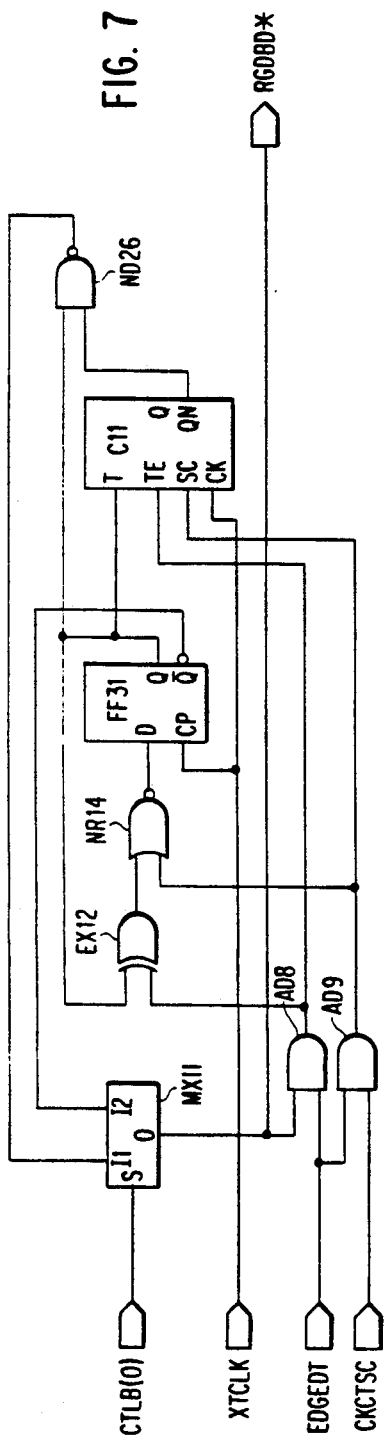
FIG. 7 shows a more detailed diagram of the GRDBD block shown in FIG. 3.

A circuit diagram of the GRDBD block 8 is shown in FIG. 7. The sampling clock XTCLK is provided to the clock inputs CP of a flip-flop FF31 and circuit C11, thus forming a two-bit counter. The mode control signal CTLB(0) is coupled to an input select line IS of a multiplexer MX11, thereby controlling how many guardband violations are necessary before the counter 10 is resynchronized. The output RGDBD* of the GRDBD block 8 is connected to an output of the multiplexer MX11 and is low when the predetermined number of violations has occurred. That is, the signal RGDBD* will have either the value of the inverted output of the flip-flop FF31 (indicating one violation has occurred) or the output of a NAND gate ND26 (indicating three violations have occurred). The signal RGDBD* is also coupled to a first input of an AND gate AD8 whose second input is connected to the edge detection ED-GEDT signal. An output of the AND gate AD8 is coupled to one input of an exclusive-OR gate EX12, whose other input is connected to the non-inverting output of the flip-flop FF31, and to a count enable TE input of the circuit C11. The edge detection signal ED-GEDT and the signal CKCTSC are respectively connected to first and second inputs of another AND gate AD9. Outputs of the AND gate AD9 and the exclusive-OR gate EX12 are respectively connected to first and second inputs of a NOR gate NR14 whose output is connected to a D input of the flip-flop FF31. The output of the AND gate AD9 also provides a synchronous clear signal to an input SC of the circuit C11. An input T of the circuit C11 is connected to the non-inverting output of the flip-flop FF31. Non-inverting outputs of the flip-flop FF31 and circuit C11 are respectively coupled to first and second inputs of the NAND gate ND26.

Figure 8:
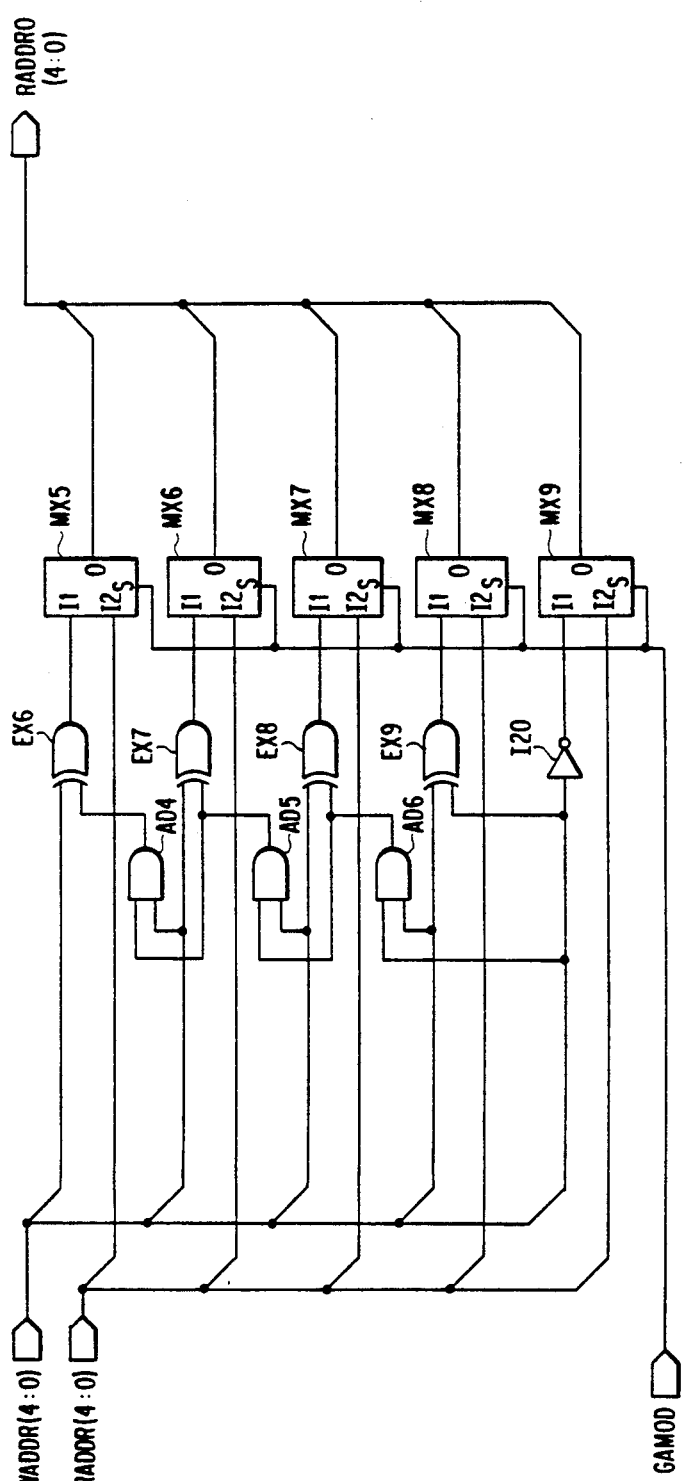
FIG. 8 shows a more detailed diagram of the ERDADD block shown in FIG. 2.

Referring now to FIG. 8, the circuit of the ERDADD block 4 is shown. As stated above, the mode signal GAMOD, which is coupled to input select lines IS of five multiplexers MX5-MX9, controls whether the ESBUF block 3 is configured as a 32-bit elastic store or a 31-bit serial shift register. As a 32-bit elastic store, the multiplexers MX5-MX9 pass the read address RADDR(4:0), generated in the CLKREC block, to the output RADDRO(4:0). On the other hand, as a 31-bit serial shift register, the output RADDRO(4:0) becomes the write address WADDR(4:0) plus one. In detail, each bit of the five-bits of the read address RADDR(4:0) are respectively coupled to each first input of the five multiplexers MX5-MX9. The LSB (least significant bit), bit zero, of the write address WADDR(0) is coupled to an input of an inverter I20 whose output is coupled to a second input of the multiplexer MX9. The write address bits WADDR(0) and WADDR(1) are coupled to first and second inputs of an exclusive-OR gate EX9 and first and second inputs of an AND gate AD6. An output of the exclusive-OR gate EX9 is coupled to a second input of the multiplexer MX8. An output of the AND gate AD6 and the write address bit WADDR(2) are respectively coupled to first and second inputs of an exclusive-OR gate EX8 and first and second inputs of an AND gate AD5. An output of the exclusive-OR gate EX8 is connected to a second input of a second input of the multiple MX7. In a similar manner, an output of the AND gate AD5 and the write address bit WADDR(3) are respectively coupled to the first and second inputs of an exclusive-OR gate EX7 and first and second inputs of an AND gate AD4. An output of the exclusive-OR gate EX7 is coupled to a second input of the multiplexer MX6. An output of the AND gate AD4 is connected to an input of an exclusive-OR gate EX6, whose second input is connected to WADDR(4). An output of the same exclusive-OR gate EX6 is connected to a second input of the multiplexer MX5.

With reference to FIG. 9, the 9-bit delay circuit of the SHIFT9 block 5 is schematically shown. A register R6 samples the data CMID read out of the ESBUF block 3 at the sampling clock XTCLK rate when the read signal RD, coupled to a select input SA of the register R6, is asserted. A non-inverting output of the register R6 is coupled to a D input of a first of nine serially arranged flip-flops FF20-FF28. A non-inverting output of the first flip-flop FF20 is coupled to a D input of a second flip-flop FF21, whose non-inverting output is coupled to a D input of a third flip-flop FF22, and so on. Finally, after nine clock RPCK delays the data PCMO is coupled to the second input of the multiplexer MX13.

Figure 13:
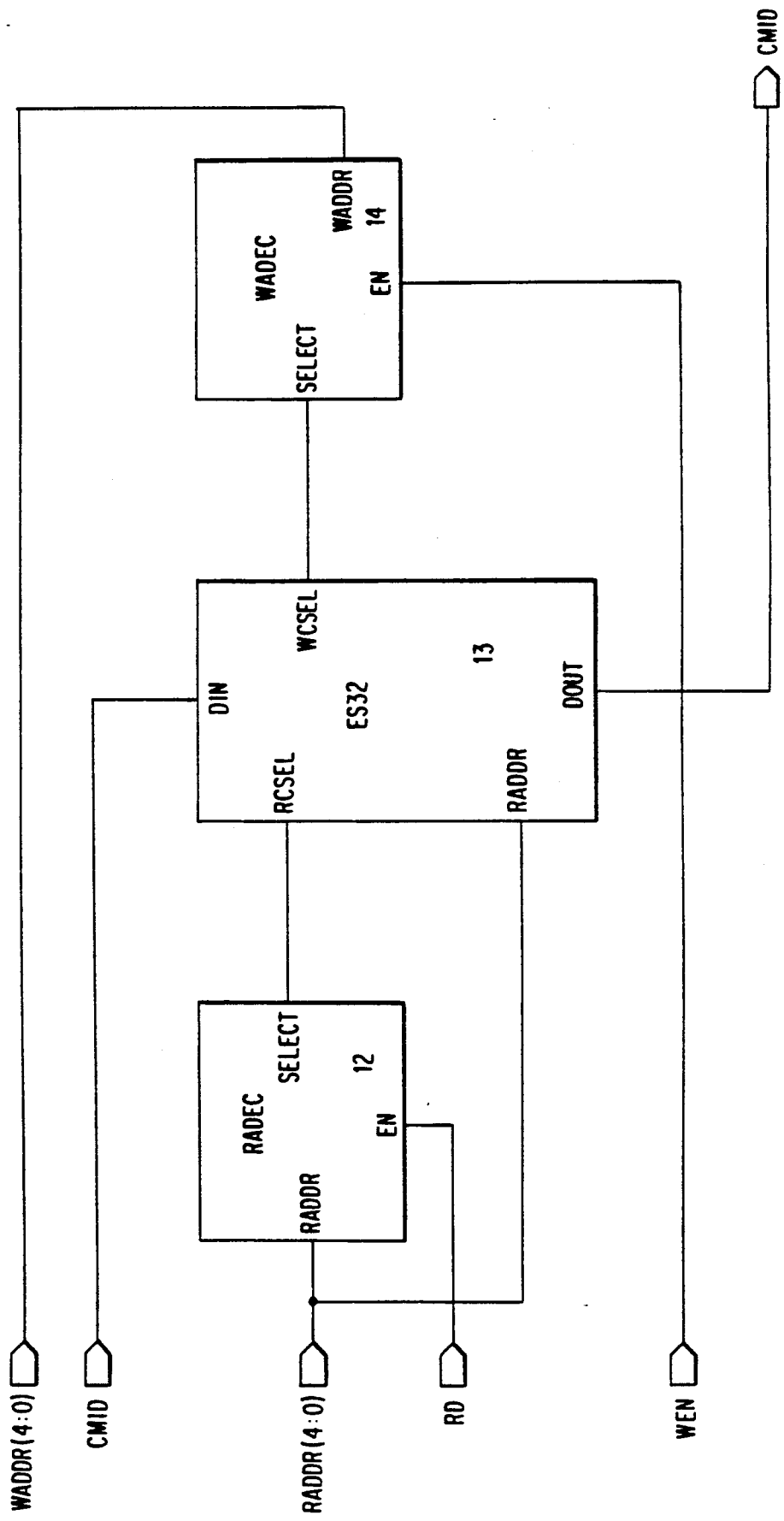
FIG. 13 shows a more detailed diagram of the ESBUF block shown in FIG. 10.

The ESBUF block 3 is further shown in FIG. 13 including two five-bit address to 32-bit decoder RADEC and WADEC blocks 12 and 13 for the read and write addresses, and a 32-bit memory ES32 block 13.

Referring now to FIG. 10, the CLKREC block 3 therein shown in more detail, includes a CKCNT block 15 which provides the data clock RCLK, an UPDATC block 14 for determining the proper phase adjustment required for the clock counter 16 in the CKCNT block 15, and a register R2 and D-type flip-flop FF8 that samples the CMI decoded data CMID outputted from the ESBUF block 3 for resynchronizing the sampled CMI decoded data CMID to the data clock RCLK.

Figure 11:
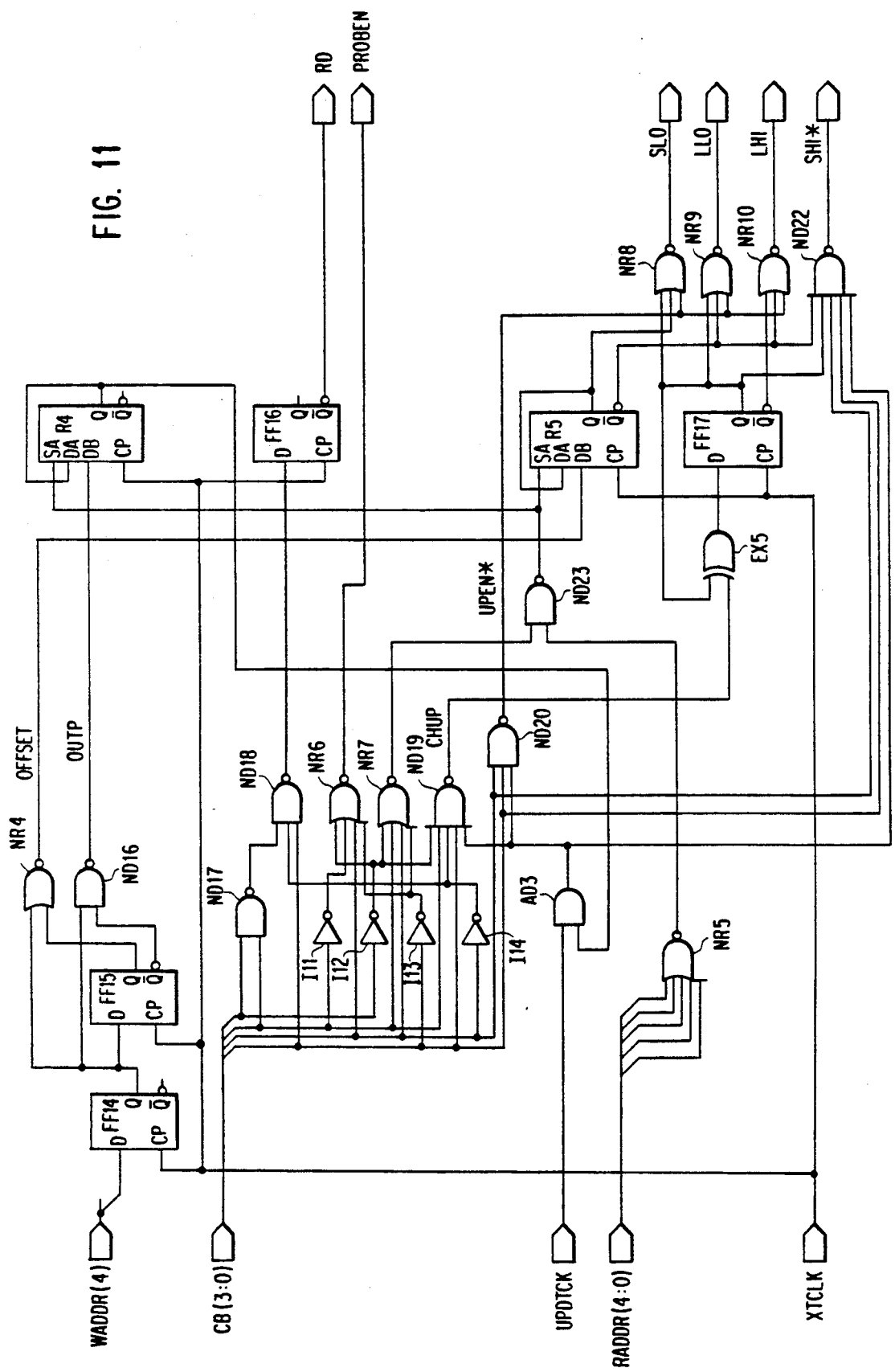
FIG. 11 shows a more detailed diagram of the UPDATC block shown in FIG. 10.

With reference to FIG. 11, there is shown a circuit diagram of the UPDATC block 14. In general, the phase difference between the initial clock signal RPCK and the data RCLK is determined by analyzing the most significant bit of the write address WADDR(4) at a fixed, predetermined location of the read address RADDR(4:0). The MSB of the write address WADDR(4) is connected to a D input of a flip-flop FF14 whose non-inverting output is coupled to a D input of a second flip-flop FF15 and the inputs of a NOR gate NR4 and NAND gate ND16. Non-inverting and inverting outputs of the second flip-flop FF15, which are delayed one sampling clock XTCLK period P from the non-inverting output of the flip-flop FF14, are respectively connected to the second inputs of the NOR gate NR4 and NAND gate ND16. An output OFFSET of the NOR gate NR4 logically represents whether the MSB of the write address WADDR(4) is asserted (i.e., whether the write address is between 16 and 31 or less than 16). The signal OFFSET determines the direction of the phase shift necessary to bring the data clock back into phase with the initial clock signal RPCK (i.e., whether the period P of the data clock RCLK must be lengthened or shortened). An output OUTP of the NAND gate ND16, on the other hand, is asserted on the transition of the MSB of the write address WADDR(4) from a low logical value to a high logical value (i.e., the transition of the write address WADDR(4:0) from 15 to 16). The signal OUTP indicates whether the phase shift between the read address RADDR(4:0) and the write address WADDR(4:0) is exactly 180° at the time when WADDR(4) is sampled. Each output of the NOR gate NR4 and NAND gate ND16 is respectively connected to a third input DB of registers R4 and R5 which are enabled to accept data on their DB inputs when an output of a NAND gate ND23 is active low.

An enable signal UPDTCK and outputs CB(3:0) of the divide-by-12 counter 16 are coupled to provide timing information as to the relative position of the phase of the data clock RCLK. The enable signal UPDTCK is active once every 250 microseconds for one period of RCLK. Specifically, the enable signal UPDTCK is coupled to an input of an AND gate AD3, along with a non-inverting output of the register R4. Inputs of the NAND gate ND18 include the count bits CB(1) and CB(0) logically NANDed by the NAND gate ND17, the count bit CB(2) via an inverter I14, and the count bit CB(3). An output of the NAND gate ND18 is coupled to a D input of the flip-flop FF16 whose inverting output represents the read signal RD for enabling the ESBUF block 3 during read operations. Three inputs of the four-input NOR gate NR6 include the inverted count bits CB(0), CB(2), and CB(3), which are respectively inverted via inverters I12, I11, and I13, and the count bit CB(1). An output of the NOR gate NR6 represents a sample signal PROBEN, which indicates when data read out of the ESBUF block 3 is valid. Inputs of the NOR gate NR7 are connected to the count bits CB(1) and CB(2) and the inverted count bits CB(0) and CB(3). An output of the NOR gate NR7 is coupled to a first input of the NAND gate ND23 whose second input is connected to an output of a five-input NOR gate NR5. The five inputs of the NOR gate NR5 are the five bits of the read address RADDR(5:0). Inputs of a five input NAND gate ND19 are connected to the count bits CB(1) and CB(3), the inverted count bits CB(0) and CB(2), and an output of the AND gate AD3. An output of the NAND gate ND19 is coupled to the input of an exclusive-OR gate EX5 whose second input is connected to a non-inverting output of the flip-flop FF17. The output of the NAND gate ND19 causes the output of flip-flop FF17 to toggle at a predetermined time. Inputs of the NAND gate ND20 are connected to the count bits CB(2) and CB(3) and the output of the AND gate AD3. An output UPEN* of the NAND gate ND20, which enables the phase adjustment of the data clock RCLK, is coupled to an input of each NOR gate NR8–NR10.

Four phase control signals SLO, LLO, LHI, and SHI*, which are the respective outputs of three NOR gates NR8–NR10 and one NAND gate ND22, adjust the phase of the counter 16 by modifying either the initial count or terminal count for one data period P (i.e., 12 counts). More specifically, the signal SLO shortens the low phase of the data clock RCLK by adjusting the initial count from two to three, the signal LLO lengthens the low phase of the data clock RCLK by adjusting the initial count from two to one, the signal LHI lengthens the high phase of the data clock RCLK by adjusting the terminal count from 13 to 14, and the signal SHI* shortens the high phase of the data clock RCLK by adjusting the terminal count from 13 to 12. Three inputs of the NOR gate NR8 are respectively connected to a non-inverting output of the flip-flop FF17, a non-inverting output of the register R5, and an output of the NAND gate ND20. First and third inputs of the NOR gate NR9 are commonly connected to the non-inverting output of the flip-flop FF17 and the output of the NAND gate ND20. The second input is connected to an inverting output of the register R5. First, second and third inputs of the NOR gate NR10 are connected to the inverting outputs of the flip-flop FF17 and register R5 and an output of the NAND gate ND20. The first two of five inputs of the NAND gate ND22 are connected to the inverting output of the register R5 and the non-inverting output of the flip-flop FF17. The third and fourth inputs are coupled to the counter's 16 output bits CB(3,2). The remaining input of the NAND gate ND22 is connected to the output of the AND gate AD3.

Figure 12:
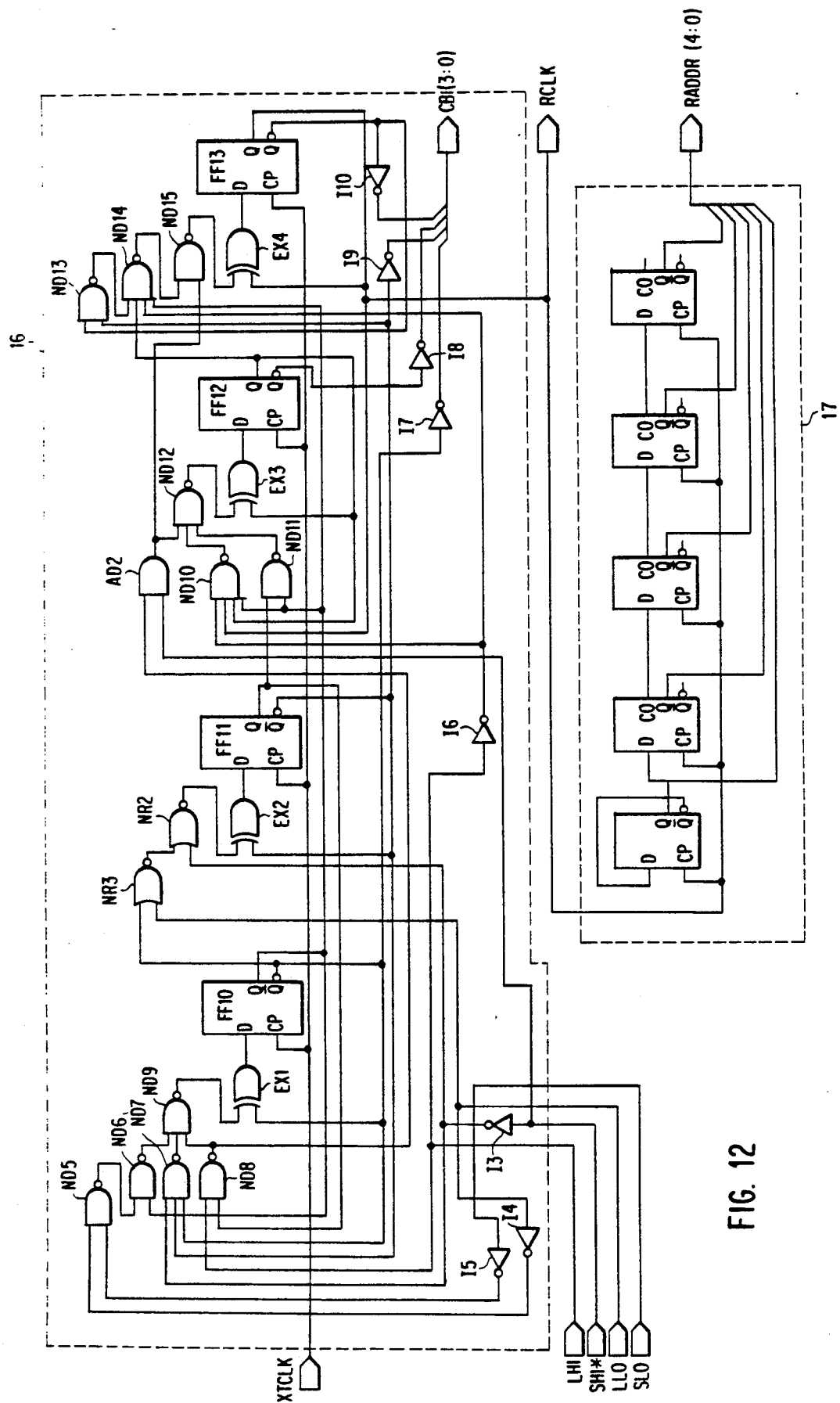
FIG. 12 shows a more detailed diagram of the CKCNT block shown in FIG. 10.

The CKCNT block 15 is shown in more detail in FIG. 12. Four D-type flip-flops FF10–FF13 are arranged to provide a divide-by-12 counter 16. Inverting outputs of the flip-flops FF10–FF13 are each inverted by inverter gates I7–I10 for providing a four-bit count signal CB(3:0). A non-inverting output of the flip-flop FF13, which is also the MSB of this counter represents the de-jittered recovered data clock RCLK. The sampling clock XTCLK is provided to each of the clock inputs CP of the four flip-flops FF10–FF13. A D input of the flip-flop FF10 is connected to the output of an exclusive-OR gate EX1. A first input of the exclusive-OR gate EX1 is connected to an inverting output of the flip-flop FF10, and a second input is connected to an output of a NAND gate ND9 whose three inputs are respectively connected to outputs of three NAND gates ND6, ND7, and ND8. An output of the NAND gate ND5 is connected to a first input of the NAND gate ND6, and a second input of the same NAND gate ND6 is connected to a non-inverting output of the flip-flop FF10. A first input of NAND gate ND7 is connected to the output of an inverter I3 whose input is one of the phase control signals SHI*. Second and third inputs of the NAND gate ND7 are connected to the inverting outputs of the flip-flops FF10 and FF11, respectively. The phase control signal LHI and non-inverting output of the flip-flop FFII are respectively connected to first and second inputs of the NAND gate ND8. First and second inputs of the NAND gate ND5 are connected to outputs of two inverters I4 and I5 whose inputs are in turn respectively connected to the phase control signals LLO and SLO. A D input of the flip-flop FF11 is connected to an output of an exclusive-OR gate EX2. First and second inputs of the exclusive-OR gate EX2 are respectively connected to an output of a NOR gate NR2 and an inverting output of the flip-flop FF11. First and second inputs of the NOR gate NR2 are respectively connected to an output of another NOR gate NR3 and an output of the inverter I3. First and second inputs of the NOR gate NR3 are connected to the inverting output of the flip-flop FF10 and the phase control signal LLO. A D input of the flip-flop FF12 is connected to an output of an exclusive-OR gate EX3, whose first and second inputs are connected to an output of a three input NAND gate ND12 and a non-inverting output of the flip-flop FF12. The three inputs of the NAND gate ND12 are respectively connected to outputs of an AND gate AD2, and two NAND gates ND10 and ND11. First and second inputs of the AND gate AD2 are connected to an output of the NAND gate ND8 and phase control signals SHI*. A first input of the NAND gate ND10 is connected to an output of an inverter I3. The second, third, and fourth inputs of the NAND gate ND10 are connected to the non-inverting outputs of the flip-flops FF12, FF13, and FF10, respectively. First and second inputs of the NAND gate ND11 are connected to the non-inverting outputs of the flip-flops FF11 and FF10. A D input of the flip-flop FF13 is connected to an output of an exclusive-OR gate EX4. First and second inputs of the exclusive-OR gate EX4 are connected to an output of a NAND gate ND15 and a non-inverting output of the flip-flop FF13. First and second inputs of the NAND gate ND15 are connected to an output of a NAND gate ND14 and an output of the AND gate AD2. The inputs of NAND gate ND14 are connected to an output of a NAND gate ND13, the non-inverting output of the flip-flop FF12, an output of an inverter I6, and the non-inverting output of the flip-flop FF10. First and second inputs of the NAND gate ND13 are connected to the inverting outputs of the flip-flops FF13 and FF11, respectively.

The read address RADDR(4:0) is generated by a five-bit counter 17 which counts in a normal binary sequence (i.e., from zero to 31) in synchronism with the data clock RCLK which is provided to the clock input of the counter.

In operation, a binary bit stream in the form of an optical signal is first converted to an electrical signal by an optical-to-electrical signal converter (not shown). The stream of binary bits CMIIN representing data that has been CMI encoded enters the PCMREC block 1 and is sampled by the serial shift register 18. The sampling clock XTCLK has a frequency of 24.576 MHz, which is 12 times the transfer rate of the incoming stream of binary bits CMIIN. Therefore, there should be typically six samples per half bit period P. In order to detect a bit boundary, the data samples shifting through the shift register are examined each sample clock XTCLK period P for a high-to-low transition that would indicate a bit boundary. That is, by CMI definition and recalling the fact that a pair of data bits "1,0" is an illegal combination, a high-to-low transition could only be a boundary between two consecutive CMI encoded data bits notwithstanding noise. Moreover, the high-to-low transition is guaranteed to occur at least every third data period P. To reduce the effects of noise, high-to-low transitions are only recognized as a bit boundary when three high samples are followed by three low samples. In other words, the edge detection signal EDGEDT will only be asserted when the outputs of the inverting outputs of the flip-flops FF1–FF3 are all high (indicating a low sample on each respective input for the previous clock cycle) and the outputs of the non-inverting outputs of the flip-flops FF4–FF6 are all high (indicating a high sample on each respective input for the previous clock cycle).

Meanwhile, the divide-by-twelve counter 10 continuously counts up from an initial count (i.e., two) to a terminal count (i.e., 13) and then rolls over to the initial count to begin counting again. The counter 10 increments its output by one for each sample clock XTCLK period P and, thus, a complete cycle for the counter 10 corresponds to one data period P. As a result, the most significant bit (MSB) of the counter 10 is used as the recovered data clock signal, and is referred to herein as the initial clock signal RPCK. Incidently, the initial count and terminal count were selected so that the initial clock signal RPCK, being the MSB of the counter, will have, on average, a 50% duty cycle.

In order to synchronize the output of the counter 10 with the incoming data CMIIN(i.e., to have the counter output transition from the terminal count to the initial count at a bit boundary), the counter 10 is reset to the initial count upon most, but not all, as will be further explained below, assertions of the edge detection signal EDGEDT. This is, assuming that the assertion of the edge detection signal EDGEDT occurs outside of the guardband region (i.e., signal GBR is asserted), the signal CKCTSC will be asserted. The signal CKCTSC causes the counter 10 to reinitialize and being counting at the initial count (i.e., two). In general, however, the edge detection signal EDGEDT should occur at, or near, the time when the counter 10 rolls over from its terminal count (i.e., 13) to its initial count (i.e., two). However, noise, jitter, and other causes will invariably cause the occurrence of a high-to-low transition far from a bit boundary (i.e., the normal roll over point of the counter 10). To overcome this problem, if the edge detection occurs too far from the time when the counter should roll over, the edge detection signal will be prevented from resynchronizing (i.e., resetting) the counter 10. More specifically, if the edge detection signal EDGEDT occurs when the output of the counter 10 is in the range of either five to ten (or six to nine, depending on the control bit CB(1)), the signal RGDBD will be asserted and, hence, GBR is not asserted, indicating that the state of the counter 10 is in the guardband region. Therefore, the occurrence of the edge detection signal EDGEDT is ignored by the DCKCNT block 9 (i.e., the CKCTSC signal is not asserted) and the counter 10 continues counting in the normal manner. The edge detection signal EDGEDT, however, is not ignored by the GRDBD block because the possibility exists that the counter 10 has an incorrect phase alignment so that all of the detected bit boundaries occur in the guardband region. For this reason, the GRDBD block 8 counts the number of consecutive edge detections that occur in the guardband region. If the GRDBD block 8 count reaches a predetermined number (one or three) then the counter 10 will be allowed to resynchronize to the next detected bit boundary, i.e., assertion of the signal EDGEDT irrespective of where the signal EDGEDT occurs with respect to the guardband region.

In general, there are three major parameters which influence the immunity of the counter 10 to noise and its jitter pull-in range (i.e., how much jitter can be tolerated on the incoming signal CMIIN while still ensuring correct operation). The parameters are the number of samples used to detect bit boundaries, the number of counter states constituting the guardband region, and the number of consecutive guardband violations before the counter is allowed to resynchronize to the next bit boundary regardless of the guardband state. The control signals CTLB(1) and CTLB(0), as shown in TABLE 1, therefore provide a means for adjusting the guardband region and the number of consecutive guardband violations before counter 10 is resynchronized to suit the particular application in which this circuit may be used.

TABLE I

| CTLB1 | CTLB0 | GUARDBAND REGION | GUARDBAND COUNT |
|---|---|---|---|
| 0 | 0 | 5–10 | Single violation |
| 0 | 1 | 5–10 | Zero violations |
| 1 | 0 | 6–9 | Single violation |
| 1 | 1 | 6–9 | Three violations |

Simultaneous with the recovery of the initial clock signal RPCK, the incoming data CMIIN is decoded. During the first half of the bit period P, the FHBVAL block 7 is synchronously cleared by the signal FHSC and enabled to count. The FHBVAL block 7 counts the number of samples having a high logical value during the first half of the bit period P. As stated above, there are six samples per half-bit period P. Although all six samples of data should have the same logical value, noise can cause some samples to be misinterpreted. To suppress the effects of noise, a majority voting scheme is used to decide if the actual value of the signal during the first half bit period P is high or low. Specifically, if four or more samples out of a total of six samples have a high logical value, then it is assumed that the signal was high for the first half of the data period P. Otherwise, it is assumed that the logical value was low. The output signal FHBV* represents the inverted value of the signal during the first half bit period P.

At the beginning of the second half of the data period P, the SHBVAL block 6, which is always enabled to count, is synchronously cleared and begins to count the number of samples that have a high logical value. Similar to the FHBVAL block 7, the SHBVAL block 6 uses the majority voting scheme to determine whether the logical value of the signal is high or low. The output signal SHBV represents the value of the signal (i.e., the majority of the samples) during the second half bit period P.

The respective outputs FHBV* and SHBV of the FHBVAL and SHBVAL blocks 7 and 6 are logical NANDed (NAND gate ND1) to produce (see TABLE 2) a decoded CMI data bit CMID. The output of the NAND gate ND1 is sampled at the end of each data period P by the register R1 when the sample signal PSE is asserted.

TABLE 2

| FHBVAL* | SHBVAL | CMID |
|---|---|---|
| 0 | 0 | illegal |
| 0 | 1 | 1 |
| 1 | 0 | 1 |
| 1 | 1 | 0 |

In synchronism with the initial clock RPCK, the five-bit counter 11 is incremented, thus generating the write address WADDR(4:0) and providing a new location to store each decoded data bit CMID in the ESBUF block 3. The decoded data CMID (i.e., the output of the register R1) is then written into the ESBUF block 3 on every occurrence of the write enable signal WEN, which also occurs once every period P of the initial clock signal RPCK.

The counter 16 in the CKCNT block generates the data clock RCLK. The counter 16 is also a divide-by-twelve counter similar to the counter 10 that is used to generate the initial clock signal RPCK. This counter 16, however, is designed so that the initial count and terminal count can be independently adjusted by the phase control signals SLO, LLO, LHI and SHI* to provide a means of eliminating jitter. Hence, the data clock RCLK is a de-jitterized version of the initial clock RPCK. In general, however, the counter 16 counts from its initial count of two to a terminal count of 13. The initial count and terminal count were selected, as in the case for the counter 10, so that the data clock RCLK, being the MSB of the counter, will have, on average, a 50% duty cycle.

The output jitter on the data clock RCLK should conform to the jitter requirements of ANSI T1.403. In order to meet these requirements, it has been determined that a phase adjustment step size of 1/12 unit interval (where a unit equals one sampling clock XTCLK period P), performed once every 250 microseconds, would be sufficient. In other words, in order to conform with ANSI T1.403, the initial count or terminal count, depending on the direction of the phase shift, will be adjusted by either adding or subtracting one to their respective values for one data clock RCLK period P. This feature is further described in view of the following.

The UPDATC block 14 compares the phase of the initial clock signal RPCK relative to the data clock RPCK by comparing the phase of the most significant bit of the write address WADDR(4) with the most significant bit of the read address RADDR(4). To simplify the circuitry necessary for this comparison, however, the logic is designed such that the comparison is performed at a fixed point in the read address RADDR(4:0) (i.e., when the read address RADDR(4:0) transitions from 31 to zero). The above comparison generates the signals OFFSET and OUTP. The signal OFFSET gives the direction of the phase shift which logically represents whether the write address WADDR(4) bit is set or not. The signal OUTP is asserted if the 180 degree shift is not present which logically represents the transition of the write address MSB WADDR(4) from a low to a high logical value. In addition with these two signals OFFSET and OUTP, timing information is acquired from the count output CB(3:0) of the counter 16.

The phase control signal SLO, LLO, LHI and SHI* which are derived from this information cause the counter 16 to make the appropriate phase shift and while maintaining, on average, a 50% duty cycle. More specifically, when the phase control signal SLO is asserted, the low phase of the counter is shortened by adjusting the initial count from two to three. On the other hand, when LLO is asserted, the low phase of the counter is lengthened by adjusting the initial count from two to one. In contrast, when the phase control signal LHI is asserted, the high phase of the counter is lengthened by adjusting the terminal count from 13 to 14. Finally, when SHI* is asserted, the high phase of the counter is shortened by adjusting the terminal count from 12 to 11.

The read address counter 17 counts through a complete five-bit binary sequence (i.e., from zero to 31) synchronous with the data clock RCLK. Therefore, decoded data CMID is read out of the ESBUF block 3 in synchronism with the data clock RCLK.

Figure 14:
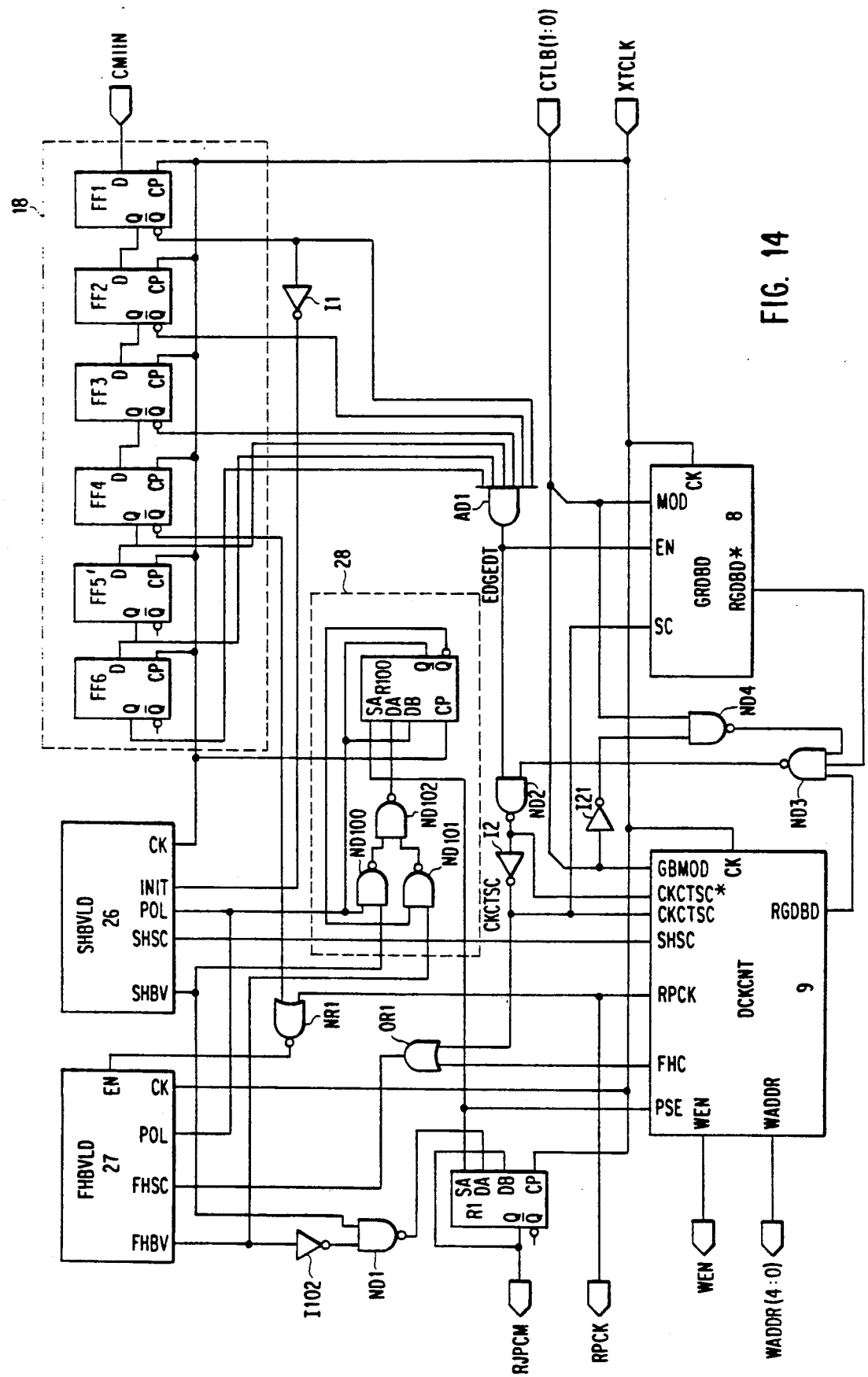
FIG. 14 shows a second embodiment of the PCMREC circuit of FIG. 3.
Figure 15:
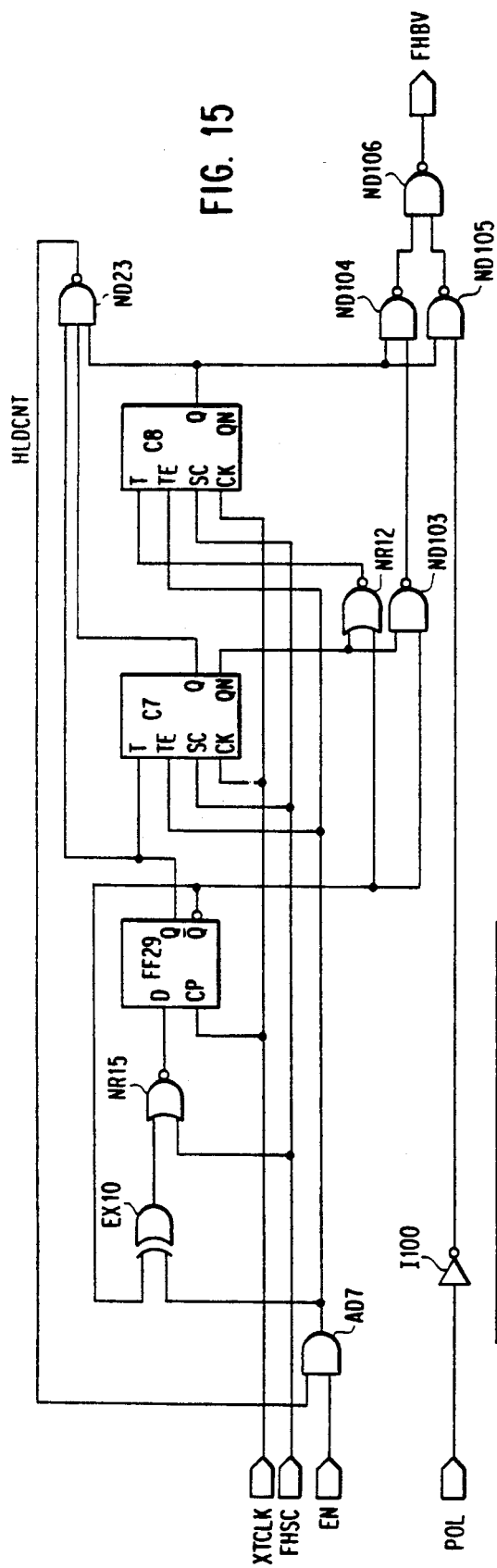
FIG. 15 shows a second embodiment of the FHBVAL circuit of FIG. 4.
Figure 16:
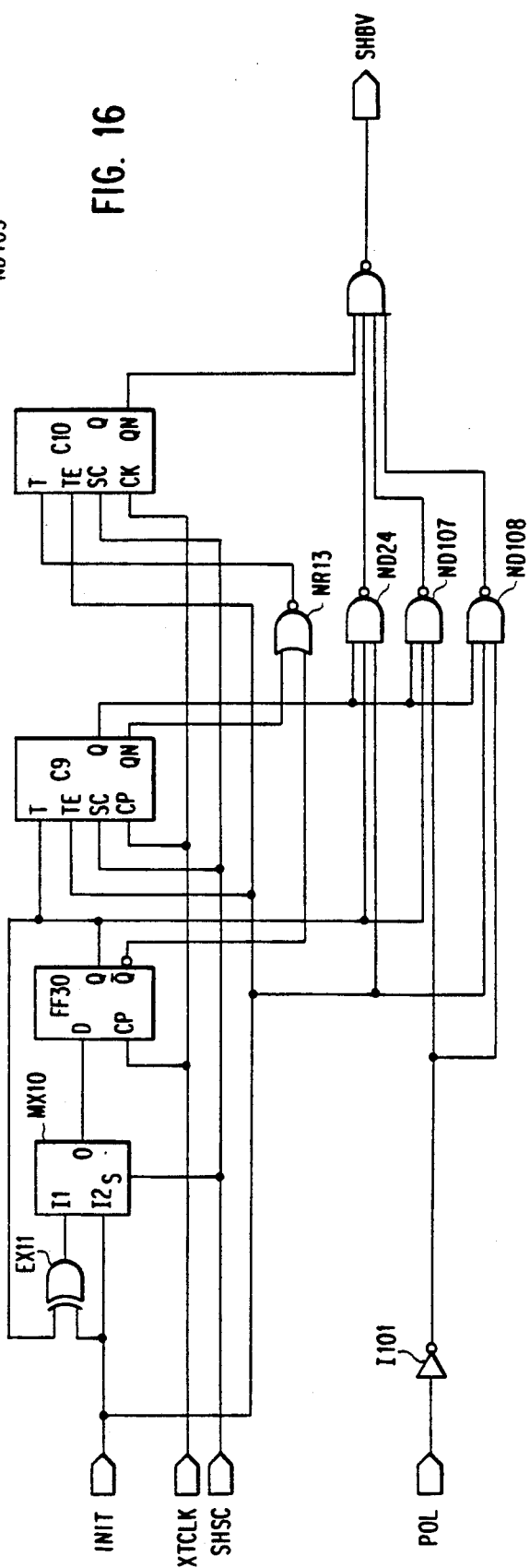
FIG. 16 shows a second embodiment of the SHBVAL circuit of FIG. 5.

In FIGS. 14, 15 and 16 there is shown a second embodiment of the decoder circuit according to FIGS. 3, 5 and 6 with additional features. Specifically, a decisional feedback unit is shown which exploits the alternate mark inversion characteristics (i.e., alternating between the pair of data bits, "0,0" or "1,1", for representing an encoded "1") of the CMI encoding format to increase the accuracy of the decoder unit and, hence, reduce the effects of noise.

With reference to FIG. 14, a previous "1" indicator 28 circuit is shown which asserts or negates a signal POL depending on whether the pair of data bits representing the previous encoded "1" was "0,0" or "1,1". The outputs FHBV and SHBV of the FHBVLD and SHBVLD blocks 27 and 26 are respectively coupled to a first input of NAND gates ND101 and ND100. A second input of the NAND gate ND100 is connected to the signal POL, which is the non-inverting output of a register R100, and a second input of the NAND gate ND101 is connected to an inverting output of the same register R100. Outputs of each NAND gate ND100 and ND101 are respectively connected to first and second inputs of a third NAND gate ND102. An output of the NAND gate ND102 is coupled to a first D input of the register R100. The non-inverting output of the register R100 is also connected to a second D input of the register R100 and provided as an input to the FHBVLD and SHBVLD blocks 27 and 26. A select line SA of the register R100 is coupled to the signal PSE.

Referring now to FIG. 15, the signal POL is connected to a first input of a NAND gate ND105 via an inverter I100. A second input to the NAND gate ND105 is connected to the non-inverting output of the circuit C8 which is also connected to a first input of another NAND gate ND104. A second input of the NAND gate ND104 is connected to an output of a NAND gate ND103 whose first and second inputs are respectively connected to the inverting outputs of the flip-flop FF29 and circuit C7. Outputs of the NAND gates ND104 and ND105 are respectively connected to first and second inputs of a NAND gate ND106 whose output provides the signal FHBV.

Referring to FIG. 16, the signal POL is connected to first inputs of three-input NAND gates ND107 and ND108 via an inverter I101. Second inputs of the NAND gates ND107 and ND108 are both connected to the non-inverting output of the circuit C9. A third input of the NAND gate ND107 is connected to the non-inverting output of the flip-flop FF30, while a third input of the NAND gate ND108 is directly connected to the signal INIT. Outputs of NAND gates ND107 and ND108, along with the output of the NAND gate ND24 and the inverting output of circuit C10, are respectively connected to inputs of a four-input NAND gate ND109 whose output provides the signal SHBV.

In essence, the decisional feedback unit provides a variation to the majority voting scheme, which was described above with reference to the first embodiment of the invention. In particular, the signal POL, depending on whether it is set or cleared, will cause either the threshold of the FHBVLD block 27 to be raised or the threshold of the SHBVLD block 26 to be lowered. The signal POL will stay set for each bit period P following a bit period P where the pair of data bits, representing an encoded "1", are high (i.e., "1,1"). On the other hand, the signal POL will stayed cleared for each bit period P following a bit period P where the pair of data bits, representing an encoded "1", are low (i.e., "0,0").

In the former situation (i.e., signal POL is set), a subsequent encoded "1" will be represented by the pair "0,0" of data bits and an encoded "0" will be represented by the pair "0,1" of data bits, which in either situation, a "0" is expected for the first half of the data period P. Therefore, because the first half logical value should not be a "1", any samples having a high logical value during the first half can be attributed to either the effects of noise or jitter. In a somewhat similar manner, when the signal POL is cleared, a subsequent encoded "1" will be represented by the pair "1,1" of data bits and an encoded "0" will be represented by the pair "0,1" of data bits, where in either situation, a "1" is expected for the second half of the data period P. Therefore, because the second half logical value should not be a "0", any samples having a low logical value can be attributed to either the effects of noise or jitter. As a result, by raising (lowering) the threshold for the first half (second half) period P when POL is set (cleared), the decoder with the additional features of the decisional feedback unit, can more effectively eliminate the effects of noise and/or jitter.

There has thus been shown and described a novel CMI decoder and clock recovery circuit which fulfills all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. A circuit for recovering a data clock, said circuit receiving at a transfer rate (1/N) a signal containing coded marked inversion (CMI)-encoded data bits, each bit of an original data signal being encoded into a pair of data bits, said pair of data bits being transmitted within a data period (N), comprising:

sampling means for sampling a received CMI-encoded signal at a predetermined rate and outputting samples of said CMI-encoded signal;

edge detection means responsive to said samples for detecting the occurrence of at least every third boundary separating each pair of data bits and outputting an edge detection signal;

first clock recovery means, including means for generating a guardband range signal, for extracting a timing signal from said CMI-encoded signal and generating an initial clock signal which is resynchronized on each occurrence of said edge detection signal occurring outside of said guardband range signal;

second clock recovery means responsive to at least one phase control signal, said second clock recovery means including means for phase-locking said data clock to said initial clock signal and means for de-jittering said data clock so as to produce a de-jittered representation of said initial clock signal; and phase control means for producing said at least one phase control signal.

2. A circuit for decoding coded marked inversion (CMI) encoded data, said circuit receiving at a transfer rate (1/N) a signal containing CMI-encoded data bits, each bit of an original data signal being encoded into a pair of data bits, said pair of data bits being transmitted within a data period (N), comprising:

sampling means for sampling a received CMI-encoded signal at a predetermined rate and outputting multiple samples of said CMI-encoded signal for each said data period;

first detection means for detecting a first logical value representative of said samples during a first half of each said data period;

second detection means for detecting a second logical value representative of said samples during a second half of each said data period; and evaluation means for comparing said first and second logical values of said first and second halves at the end of each said data period and outputting a CMI-decoded data bit as a result of said comparing.

3. The circuit as claimed in claim 1 or 2, wherein said sampling means comprises:

plurality of flip-flop circuits serially arranged so as to form a serial shift register having a stage for each of said plurality of flip-flop circuits, said plurality of flip-flops circuits operating synchronously at said predetermined rate.

4. The decoder circuit as claimed in claim 2, further comprising:

buffer means for storing a plurality of said CMI-decoded data bits at a rate of a first recovered clock signal and outputting said plurality of said CMI decoded data bits at a rate of a second recovered clock signal.

5. The circuit as claimed in claim 2, wherein said first detection means comprises:
counter means for counting the samples having a high logical value within said first half of said data period; and
means responsive to said counter for setting a signal if said counter exceeds a predetermined count.

6. The circuit as claimed in claim 2, wherein said second detection means comprises:
counter means for counting the samples having a high logical value within said second half of said data period; and
means responsive to said counter for setting a signal if said counter exceeds a predetermined count.

7. The circuit as claimed in claim 5 or 6, wherein said predetermined count constitutes a majority of said samples.

8. The circuit as claimed in claim 3, wherein said edge detection means comprises:
AND gate means having an input for each stage of said serial shift register of said sampling means for detecting a predetermined pattern constituting said boundary and outputting said edge detection signal.

9. The circuit as claimed in claim 1, wherein said first clock recovery means comprises:
counting means for continuously counting from an initial count to a terminal count at said predetermined rate and outputting a count, such that a complete cycle of counting from said initial count to said terminal count is equivalent to said data period (N), said counter being reset to said initial count upon each occurrence of said edge detection signal occurring outside of said guardband range signal, said initial clock signal being produced as a most significant bit of said count;
guardband means for counting consecutive occurrences of said edge detection signal occurring inside of said guardband range signal, and
synchronizing means for resetting said counting means to said initial count upon the next occurrence of said edge detection signal when said guardband count reaches a predetermined count, irrespective of when said edge detection signal occurs relative to said guardband range signal.

10. The circuit as claimed in claim 9, wherein said initial count and said terminal count are determined such that said initial clock signal has approximately a 50% duty cycle.

11. The circuit as claimed in claim 9, said guardband range signal is constituted as a binary range having a lower value greater than said initial count, and an upper value greater than said initial count and less than said terminal count.

12. The circuit as claimed in claim 4, wherein said buffer means comprises:
32 bits of memory cells arranged as 32 words, each said word being one-bit wide, said memory cells having fully independent read and write operations;
read address decoder for decoding said read address and selecting one of 32 select read lines; and
write address decoder for decoding said write address and selecting one of 32 select write lines.

13. The circuit as claimed in claim 4, wherein said buffer means comprises:
32 bits of memory cells arranged as a 31-bit serial shift register, said memory cells having fully independent read and write operations;
read address decoder for decoding said read address and selecting one of 32 select read lines; and
write address decoder for decoding said write address and selecting one of 32 select write lines.

14. The circuit as claimed in claim 4, wherein said buffer means comprises:
32 bits of memory cells arranged as a 31-bit serial shift register, said memory cells having fully independent read and write operations;
read address decoder for decoding said read address and selecting one of 32 select read lines;
write address decoder for decoding said write address and selecting one of 32 select write lines; and
a delay means for receiving and delaying said CMI decoded data from said 31-bit serial shift register.

15. The circuit as claimed in claim 1, wherein said second clock recovery means comprises:
counter means for continuously counting from an initial count to a terminal count at said predetermined rate and outputting a count such that a complete cycle of counting from said initial count to said terminal count equals said data period (N), wherein the most significant bit of said count represents said data clock; and
means responsive to said at least one phase control signal for adjusting said initial count or said terminal count thereby phase-aligning said data clock with said initial clock signal.

16. The circuit as claimed in claim 1, wherein said phase control means comprises:
phase comparison means for comparing the phase of said initial clock and said data clock at a second predetermined rate and outputting said at least one phase control signal.

17. The circuit as claimed in claim 16, wherein said second predetermined rate equals approximately 4,000 Hz.

18. A circuit for decoding CMI encoded data, said circuit receiving at a transfer rate (1/N) a signal containing CMI-encoded data bits each bit of an original data signal being encoded into a pair of data bits, said pair of data bits being transmitted within a data period (N), comprising:
sampling means for sampling a received CMI-encoded signal at a predetermined rate and outputting multiple samples of said CMI-encoded signal for each data period;
first counter means for counting the samples having a high logical value within a first half of each said data period and outputting a first signal if said first counter exceeds a first predetermined count;
second counter means for counting the samples having a high logical value within a second half of each said data period and outputting a second signal if said second counter exceeds a second predetermined count;
decisional feedback means for raising or lowering said first or second predetermined count depending on whether a previous pair of data bits, representing a CMI-encoded "1", had logical values of "0"s or "1"s; and evaluation means for comparing the first and second signals at the end of each said period and outputting said CMI decoded data bit as a result of said comparing.

19. A circuit for recovering a data clock, said circuit receiving at a transfer rate (1/N) a signal containing coded marked inversion (CMI)-encoded data bits, each bit of an original data signal being encoded into a pair of data bits, said pair of data bits being transmitted within a data period (N), comprising:

shift register means having an output for each stage of said shift register for sampling a received CMI-encoded signal and shifting said samples through said shift register at a predetermined rate;

boundary detection means for detecting each occurrence of a high-to-low transition of said CMI-encoded signal by simultaneously comparing said outputs of said shift register with a predetermined pattern and outputting an edge detection signal when said predetermined pattern is detected;

first counting means for generating an initial recovered clock signal from said CMI-encoded signal by continuously counting at said predetermined rate from an initial count to a terminal count;

reset means for resetting said first counting means to said initial count when said edge detection signal occurs outside a guardband range, said guardband range constituting a binary range of said first counting means having a first binary value greater than said initial count and a second binary value greater than said first binary value and less than said terminal count;

second counting means for counting consecutive occurrences of said edge detection signal occurring inside said guardband range, said second counting means being reset on each occurrence of said edge detection signal occurring outside of said guardband range;

synchronizing means for resetting said first counting means on the next occurrence of said edge detection signal irrespective of whether said edge detection signal occurs inside or outside of said guardband range when said second counting means reaches a predetermined count;

third counting means for generating said data clock by continuously counting at said predetermined rate from a second initial count to a second terminal count;

phase control means for comparing the phase of said initial clock signal with said data clock and modifying said second initial count and second terminal count of said predetermined binary range causing a high phase or low phase of said data clock to be lengthened or shortened thereby keeping said data clock phase-locked to said initial clock signal.

20. The circuit as claimed in claims 1, 2, 9, 15, 18, or 19 wherein said predetermined rate is 12 times greater than said transfer rate.

21. A circuit for decoding coded marked inversion (CMI) encoded data, said circuit receiving at a transfer rate (1/N) a signal containing CMI-encoded data bits, each bit of an original data signal being encoded into a pair of data bits, said pair of data bits being transmitted within a data period (N), comprising:

shift register for sampling a received CMI-encoded signal and shifting said samples through said shift register at a predetermined rate;

first evaluator means for counting ones of said samples having a high logic value during a first half of said transfer period (N) and outputting a first signal representative of whether a majority of said samples have a high logic value;

second evaluator means for counting ones of said samples having a high logic value during a second half of said transfer period (N) and outputting a second signal representative of whether a majority of said samples have a high or low logic value;

decoder means for comparing said first and second signals and outputting a CMI-decoded data bit as a result of said comparing;

storage means responsive to write control signals for storing said CMI-decoded data bits at a rate of a first recovered clock signal to a location determined by a write address, said storage means being simultaneously responsive to read control signals for outputting said CMI-decoded data bits at a rate of a second recovered clock signal from a location determined by a read address;

first counting means whose output constitutes said write address, said first counting means being incremented at the rate of said first recovered clock signal; and second counting means whose output constitutes said read address, said second counting means being incremented at the rate of said second recovered clock signal.

22. A method for decoding coded marked inversion (CMI)-encoded data transmitted at a first predetermined rate (1/N), comprising the steps of:

taking multiple samples of a stream of binary bits representing said CMI-encoded data at a second predetermined rate;

incrementing a first counter for each sample having a high logical value during a first half of said data period (N), and outputting a first signal if said first counter reaches a first predetermined number;

incrementing a second counter for each sample have a high logical value during a second half of said data period (N), and outputting a second signal if said second counter reaches a second predetermined number; and comparing said first and second signals and outputting a signal representing a CMI-decoded data bit as a result of said comparing.

23. A method for decoding CMI encoded data as claimed in claim 22, further comprising the steps of:

determining whether ones of said CMI-decoded data bits having a logical value of "1" were represented by a pair of data bits having logical values of (0,0) or (1,1); and raising or lower said first or second predetermined number in response to said determination.

24. A method for recovering a data clock from an incoming stream of coded marked inversion (CMI)-encoded data, comprising the steps of:

producing an initial recovered clock signal by incrementing a first counter at a predetermined rate (N) counting from an initial count to a terminal count, said initial recovered clock being produced at an output of said first counter;

producing a recovered data clock signal phase-locked to said initial recovered clock signal by incrementing a second counter at a predetermined rate (N) counting from a second initial count to a second terminal count, said recovered data clock being produced as an output of said second counter;

sampling the stream of CMI-encoded data at said predetermined rate (N);

detecting a high-to-low transition in said stream of CMI-encoded data by comparing multiple ones of the samples of the stream of CMI encoded data and detecting a predetermined pattern therein;

resetting said first counter to said initial count upon detection of said predetermined pattern occurring outside a guardband range;

determining a phase shift between said initial recovered clock signal and said recovered data clock; and incrementing or decrementing said second initial count or said second terminal count to phase-lock said recovered data clock with said initial recovered clock such that said data clock maintains on average a 50% duty cycle.

25. A method for recovering a data clock as claimed in claim 24, further comprising the steps of:

incrementing a third counter if said high-to-low transitions occur inside said guardband range;

resetting said third counter if said high-to-low transitions occur outside said guardband range; and resetting said first counter to said initial count if said third counter reaches a predetermined count.

* * * * *

UNITED STATES PATENT AND TRADEMARK OFFICE
CERTIFICATE OF CORRECTION

PATENT NO. : 5,195,110
DATED : March 16, 1993
INVENTOR(S) : Steven Scott Gorshe

It is certified that error appears in the above-indentified patent and that said Letters Patent is hereby corrected as shown below:

Col. 12, line 33, delete "II" and insert --11--.

Col. 17, line 7, delete "1100" and insert --I100--.

Signed and Sealed this

Twenty-eighth Day of December, 1993

Attest:

BRUCE LEHMAN

*Attesting Officer*   *Commissioner of Patents and Trademarks*